United States Patent
Hahn

(10) Patent No.: US 8,417,219 B2
(45) Date of Patent: Apr. 9, 2013

(54) PRE-AUTHENTICATION METHOD FOR INTER-RAT HANDOVER

(75) Inventor: Gene Beck Hahn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 586 days.

(21) Appl. No.: 12/351,688

(22) Filed: Jan. 9, 2009

(65) Prior Publication Data

US 2009/0186601 A1    Jul. 23, 2009

(30) Foreign Application Priority Data

Jan. 9, 2008 (KR) .................. 10-2008-0002692
Jul. 3, 2008 (KR) .................. 10-2008-0064482

(51) Int. Cl.
*H04M 1/66* (2006.01)
*H04M 1/68* (2006.01)
*H04M 3/16* (2006.01)

(52) U.S. Cl.
USPC ............. 455/411; 455/412.1; 455/412.2; 455/414.1; 455/436; 455/437; 455/438; 455/439; 455/440; 455/441; 455/442; 455/443; 455/444; 455/552.1

(58) Field of Classification Search .......... 455/411, 455/412.1–412.2, 414.1, 436–444, 552.1
See application file for complete search history.

(56) References Cited

U.S. PATENT DOCUMENTS

| | | | | |
|---|---|---|---|---|
| 7,643,830 | B2* | 1/2010 | Catovic et al. | 455/436 |
| 7,953,391 | B2* | 5/2011 | Lee et al. | 455/411 |
| 2006/0176852 | A1 | 8/2006 | Wu et al. | |
| 2007/0021119 | A1 | 1/2007 | Lee et al. | |
| 2007/0072605 | A1 | 3/2007 | Poczo | |
| 2007/0204155 | A1 | 8/2007 | Dutta et al. | |

FOREIGN PATENT DOCUMENTS

| | | |
|---|---|---|
| CN | 1913437 | 2/2007 |
| CN | 1943211 | 4/2007 |
| WO | 2006/083039 | 8/2006 |

OTHER PUBLICATIONS

Ntantogian, et al., "Efficient Authentication for Users Autonomy in Next Generation All-IP Networks", Biometrics '07, Dec. 2007.

* cited by examiner

*Primary Examiner* — Wayne Cai
*Assistant Examiner* — Matthew Genack
(74) *Attorney, Agent, or Firm* — Lee, Hong, Degerman, Kang & Waimey

(57) ABSTRACT

A pre-authentication method for an Inter-RAT handover is disclosed. This pre-authentication method relates to a wireless access system, and provides a method for performing pre-authentication in case of an inter-RAT handover managed by different administrative domains. The method for performing pre-authentication before a handover in order to quickly perform an Inter-Radio Access Technology (Inter-RAT) handover, includes, transmitting a message having terminal information needed for the pre-authentication to a target authentication server, receiving security-associated information of a target network from the target authentication server, wherein the target network security-associated information is generated by the mobile terminal information, and generating security-associated information, which will be used by the mobile terminal in the target network, using the security-associated information of the target network, and performing the pre-authentication.

7 Claims, 6 Drawing Sheets

PRE-AUTHENTICATION METHOD FOR INTER-RAT HANDOVER

CROSS-REFERENCE TO RELATED APPLICATIONS

This application claims the benefit of the Korean Patent Application No. 10-2008-0002692, filed on Jan. 9, 2008 and the Korea Patent Application No. 10-2008-0064482, Jul. 3, 2008 which is hereby incorporated by reference as if fully set forth herein.

BACKGROUND OF THE INVENTION

1. Field of the Invention

The present invention relates to a wireless access system, and more particularly to a pre-authentication method for an Inter-Radio Access Technology (Inter-RAT) handover managed by different administrative domains.

2. Discussion of the Related Art

A general handover procedure and an authentication procedure based on a Privacy and Key Management Sublayer (PKM) prescribed in the IEEE 802.16 standard will hereinafter be described in detail.

FIG. 1 is a flow chart illustrating a method for performing a handover and initial network entry process.

Referring to FIG. 1, a mobile station (MS) selects a cell to enter the initial network or to perform handover at steps S101 and S102. During this cell selection, the mobile station (MS) performs scanning or ranging for at least one base station in order to search for an appropriate base station for either a network connection or a handover. The mobile station (MS) may schedule a scan period or a sleep period to determine whether or not the mobile station (MS) can enter an initial network for the base station or a target base station.

When the mobile station (MS) enters the initial network, it can be synchronized with a serving base station simultaneously while acquiring downlink parameters from the serving base station (SBS) at step S103. In this case, the SBS may provide a service over the network desired by the MS. The MS establishes synchronization with the SBS, and then acquires uplink parameters for the SBS at step S104. The MS performs the ranging process with the SBS, and adjusts the uplink parameters along with the SBS at step S105. By the above-mentioned steps, the MS and the SBS form basic functions for communication at step S106. The SBS authorizes the mobile station (MS) and exchanges keys with this MS at step S107. So, the MS is registered in the SBS at step S108, and establishes an IP connection to the SBS at step S109.

The SBS transmits operation parameters to the MS, such that it can communicate with the MS at step S110. A connection between the MS and the SBS is established at step S111, such that the MS and the SBS can carry out normal operations at step S112. The MS can continuously search for a neighboring base station while the SBS performs normal operations at step S113. As the MS becomes distant from the SBS while in motion, a quality of service (QoS) provided from the SBS is gradually lowered, such that the mobile station (MS) must continuously search for the neighboring base station capable of providing better services. In this case, the neighboring base station providing a service better than that of the SBS is called a target base station (TBS), and the MS searches for the TBS, such that this MS can be handed over to the searched TBS.

Generally, the handover is carried out when the MS moves from the serving base station (SBS) to the target base station (TBS). Namely, the handover is carried out when a radio interface, service flow, and a network access point of the MS are shifted from the SBS to the TBS. If the MS, the SBS, or a network administrator decides the handover at step S114, the handover starts operation.

The MS selects the TBS at step S115, can establish synchronization with the TBS, and can also acquire downlink parameters from the TBS at step S116. The MS acquires uplink parameters from the TBS at step S117, performs the ranging process with the TBS, and adjusts the uplink parameters along with the TBS at step S118. In this case, if the MS has received an NBR-ADV message including an identifier of the TBS, a frequency, and uplink/downlink channel descriptors (UCD/DCD), the scanning process and the synchronization process can be simplified. If the TBS receives a handover notification message from the SBS over a backbone network, a non-competitive initial ranging opportunity may be provided to an Uplink MAP (UL-MAP).

By the above-mentioned procedure, the MS and the TBS form basic functions at step S119. The MS and the TBS perform the ranging process to start re-entering the network. Also, the MS is re-registered in the TBS, and establishes a re-connection to the TBS at step S120. So, the MS is registered in the TBS at step S121, and an IP connection from the TBS is re-established in the MS at step S122. As a result, the TBS serves as the SBS, such that it can provide the MS with necessary services.

The handover of FIG. 1 will hereinafter be described in detail. The MS re-selects the cell on the basis of neighboring base station information acquired by the scanning, and is handed over from the SBS to the TBS. Therefore, the MS establishes synchronization with the TBS and performs the ranging process with the TBS. Thereafter, the TBS performs reauthorization for the MS. Herein, the TBS can request information of the MS from the SBS over a backbone network.

The handover and network reentry process can be greatly simplified according to MS-associated information owned by the TBS. Some network entry processes may be omitted according to an amount of MS-associated information owned by the TBS.

FIG. 2 is a flow chart illustrating a method for allowing the IEEE 802.16 system to authenticate a mobile station (MS).

FIG. 2 shows a current authentication procedure, and represents an information transmission format and a flow of messages. However, these messages having transmission/reception (Tx/Rx) information of an MS 200, a base station (BS) 200, or an Authentication, Authorization, Accounting (AAA) server 240 may have a variety of formats.

Referring to FIG. 2, if the MS 200 desires to enter the network, the MS 200 acquires synchronization from the BS 220, and performs the ranging with the BS 220. Thereafter, the MS 200 negotiates with the BS 200 about their basic capabilities using an SBC-REG-/RSP message at step S201. Namely, the MS 200 and the BS perform the basic capability negotiation at step S201.

The following Table 1 shows an exemplary SBC-REG/RSP message for the basic capability negotiation between the MS and the BS.

TABLE 1

SBC-REQ/RSP{
   Requisite Parameter
   Physical Parameters Supported
   Bandwidth Allocation Support
   Selective Parameter
   Capabilities for construction and transmission of MAC PDUs TABLE 1-continued PKM Flow Control
Authorization Policy Support
Maximum Number of Supported Security Association
Security Negotiation Parameters
HMAC-CMAC Tuple
}

In Table 1, a Subscribe Station Basic Request (SBC-REQ) message is transferred by the mobile station (MS) during the initialization. In response to the SBC-REQ message, the base station (BS) transmits a Subscribe Station Basic Response (SBC-RSP) message to the mobile station (MS). The SBC-REQ/RSP messages are used for the basic capability negotiation between the MS and the BS.

The basic capability negotiation is carried out after the ranging process, such that the MS can transfer its own basic capabilities to the BS by this basic capability negotiation. In Table 1, the SBC-REQ/RSP messages may include not only mandatory parameters but also optional parameters.

A security association (SA) is indicative of an aggregate of security information units shared between the BS and at least one MS in order to provide the IEEE 802.16-based network with security communication. In association with the security association (SA) of Table 1, an Authorization Policy Support field and a security negotiation parameter may be used.

The Authorization Policy Support field is one of fields contained in the SBC-REG/RSP messages, and describes an authorization policy which must be negotiated between the MS and the BS, and synchronization of the authorization policy must be established between the MS and the BS. If the Authorization Policy Support field is omitted, the MS and the BS must use the IEEE 802.16 security having an X.509 certificate and an RSA public key algorithm.

The following Table 2 shows an example of a general Authorization Policy Support field.

TABLE 2

| Type | Length | Value | Field |
|------|--------|-------|-------|
|      | 1      | Bit #0: IEEE 802.16 Privacy Supported<br>Bits #1-7: Reserved, shall be set to zero | SBC-REQ,<br>SBC-RSP |

| Type | Length | Value |
|------|--------|-------|
|      | 1      | Bit #0: RSA-Based Authorization at the Initial Network Entry<br>Bit #1: EAP-Based Authorization at Initial Network Entry<br>Bit #2: Authenticated EAP-based Authorization at the initial Network Entry<br>Bit #3: Reserved, set to 0<br>Bit #4: RSA-Based Authorization at Reentry<br>Bit #5: EAP-Based Authorization at Reentry<br>Bit #6: Authenticated EAP-Based Authorization Reentry<br>Bit #7: Reserved, shall be set to 0 |

The Security Negotiation parameter field indicates whether or not the security capabilities, which must be negotiated before the initial Authorization procedure or the reauthorization procedure, are supported.

The following Table 3 shows an example of a general Security Negotiation parameter field.

TABLE 3

| Type | Length | Contents | Field |
|------|--------|----------|-------|
| 25   | variable | The Compound field contains the subattributes as defined in the table below | SBC-REQ,<br>SBC-SRP |

TABLE 3-continued

| Sub-Attributes | Contents |
|----------------|----------|
| PKM Version Support | Version of Privacy Sublayer Supported |
| Authorization Policy Support | Authorization Policy to Support |
| Message Authentication code Mode | Message Authentication Code to Support |
| PN Window size | Size Capability of the Receiver PN Window per SAID |

In the meantime, the PKM Version Support field of Table 3 describes a PKM version. Namely, the mobile station (MS) and the base station (BS) negotiate with each other to use only one PKM version.

The following Table 4 shows an example of a general PKM Version Support field.

TABLE 4

| Type | Length | Value |
|------|--------|-------|
| 25.1 | 1 | Bit #0: PKM Version 1<br>Bit #1: PKM Version 2<br>Bit #2-7: Reserved value, set to 0 |

Referring back to FIG. 2, the MS 200 requests an Extensible Authentication Protocol (EAP) from the AAA server 240 via the BS 220. In response to this request from the MS 200, the AAA server 240 performs user authentication by applying the EAP authentication method to the MS 200 at step S202.

The EAP-TLS may use the X.509 Certificate as an example of the EAP authentication method. The EAP-SIM may use a credit guarantee having a specific format such as a Subscriber Identity Module (SIM). However, an RSA authentication method, which uses an encryption algorithm based on a public key algorithm, may also be used according to system requirements.

At step S202, if the MS authentication (or the user authentication) has been successfully carried out, the AAA server 240 generates a Master Session Key (MSK) using the EAP-based authentication method. The AAA server transmits the MSK to the MS and the BS at steps S203 and S204.

An authorization key (AK) may be generated from the MS 200 and the BS 220 according to the PMK scheme (i.e., EAP-based authentication scheme) at step S205. The MS 200 and the BS 220 may generate the AK using the MSK, and the AK may be used to generate a Traffic Encryption Key (TEK) for communication between the MS 200 and the BS 220.

The MS 200 and the BS 220 share the TEK by a 3-way handshaking at step S206. This 3-way handshaking is carried out by a three-step handshaking, which is composed of an SA-TEK challenge step, an SA-TEK request step, and an SA-TEK response step. In this case, the TEK used for encrypting actual data is generated such that the MS 200 and the BS 220 share the generated TEK.

The BS 220 and the MS 200, which has generated the AK using the authentication procedure, share the TEK and then perform the network entry procedure at step S207.

SUMMARY OF THE INVENTION

Generally, a wireless access system has no details of the security association associated with a handover between heterogeneous wireless access networks (i.e., an Inter-RAT handover). For example, if an MS employing the IEEE 802.16 network is handed over to another wireless access system, the above wireless access system has no method for establishing the authentication and the security association (SA).

If an Inter-RAT handover of a multi-mode MS is carried out under general communication environments, the multi-mode MS must perform a new authentication and encryption key acquisition procedure while it performs a second-layer handover toward a new network. This acquisition procedure may encounter a considerable delay in user-service provision, and may have the possibility of losing data.

If a mobile station is handed over from one wireless access network to another wireless access network and its access point is changed to another, the service continuity may be damaged by this handover. This changing of the access point may bring about the changing of an administrative domain. This administrative domain changing requires a new authentication procedure, and the delay of a processing time generated by the authentication procedure delays the completion of the handover procedure, such that a serious problem may unexpectedly occur in a currently-received multimedia session.

The present invention has been devised to solve the above-mentioned technical problems. Namely, the present invention provides a method for establishing a security association (SA) by a pre-authentication during an Inter-RAT handover managed by several administrative domains.

An object of the present invention is to provide a pre-authentication method during an Inter-RAT handover between communication networks managed by plural administrative domains.

Another object of the present invention is to provide a method for allowing an access between different access networks to support a handover between heterogeneous networks (i.e., an Inter-RAT handover), resulting in the improvement of a user environment.

In order to solve the above-mentioned technical problems, the present invention relates to a wireless access system, and more particularly to a pre-authentication method for an inter-RAT handover managed by different administrative domains.

To achieve these objects and other advantages and in accordance with the purpose of the invention, as embodied and broadly described herein, a method for performing pre-authentication before a handover in order to quickly perform an Inter-Radio Access Technology (Inter-RAT) handover, the method includes: a) transmitting a message including mobile terminal information needed for the pre-authentication to a target authentication server; b) receiving first security-associated information from the target authentication server, wherein the first security-associated information is generated by the target authentication server the mobile terminal information; and c) generating second security-associated information using the first security-associated information, wherein the second security-associated information will be used by the mobile terminal in the target network; and d) performing the pre-authentication.

The mobile terminal information may include at least one of specific information defining the pre-authentication, an identifier of a serving network, an identifier of a serving authentication server, an identifier of the target network, and an identifier of the mobile terminal, and a Media Access Control (MAC) address of the mobile terminal.

The first security-associated information may include at least one of a random number (RAND), an authentication token (AUTN), a message authentication code (MAC), and protected pseudonym information.

The second security-associated information is generated by an integrity key and a cipher key in the mobile terminal.

In another aspect of the present invention, there is provided a method for performing pre-authentication before a handover in order to quickly perform an Inter-Radio Access Technology (Inter-RAT) handover, the method includes: transmitting mobile terminal information needed for the pre-authentication to a target authentication server, wherein the mobile terminal information is received from a mobile terminal, transmitting a first security-associated information to the mobile terminal, wherein the first security-associated information is received from the target authentication server, and transmitting a second security-associated information to the target authentication server, wherein the second security-associated information is received from the mobile terminal.

In another aspect of the present invention, there is provided a method for performing pre-authentication before a handover in order to quickly perform an Inter-Radio Access Technology (Inter-RAT) handover, the method including: a) receiving a message having terminal information; b) extracting authentication information available for a target network from a home subscriber server (HSS); c) generating first security-associated information of the target network using the mobile terminal information and the authentication information; d) transferring the security-associated information of the target network to the mobile terminal.

The method may further include, after performing the step d), e) receiving security-associated information of the mobile terminal, wherein the security-associated information is generated using the security-associated information of the target network; f) transferring a message having the security-associated information of the target network to a target network authenticator; and g) performing a handover between the mobile terminal and the target network.

The message including the first security-associated information may be clearly transferred to the mobile terminal via a target network authenticator.

The message including the second security-associated information may be transferred to the mobile terminal via a target network authenticator and a serving authenticator.

The first security-associated information is associated with the target authentication server, and the second security-associated information is associated with the mobile terminal.

The present invention has the following first and second effects.

According to the first effect, if a mobile station performs a handover between heterogeneous networks (i.e., an Inter-RAT handover), and an authentication procedure consuming a long period of time is carried out before the handover, such that a rapid security association (SA) for wired or wireless communication can be established. As a result, the present invention provides a seamless service, such that it can prevent a quality of service (QoS) from being deteriorated.

According to the second effect, if a multi-mode mobile station moves from a first IEEE-based network to a second IEEE-based network or performs an Inter-RAT handover from the first IEEE-based network to a non-IEEE-based network, the present invention provides a method for performing pre-authentication and acquiring security-associated keying materials. Therefore, the present invention supports the handover procedure to be quickly carried out, such that it can provide a user with a seamless service.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
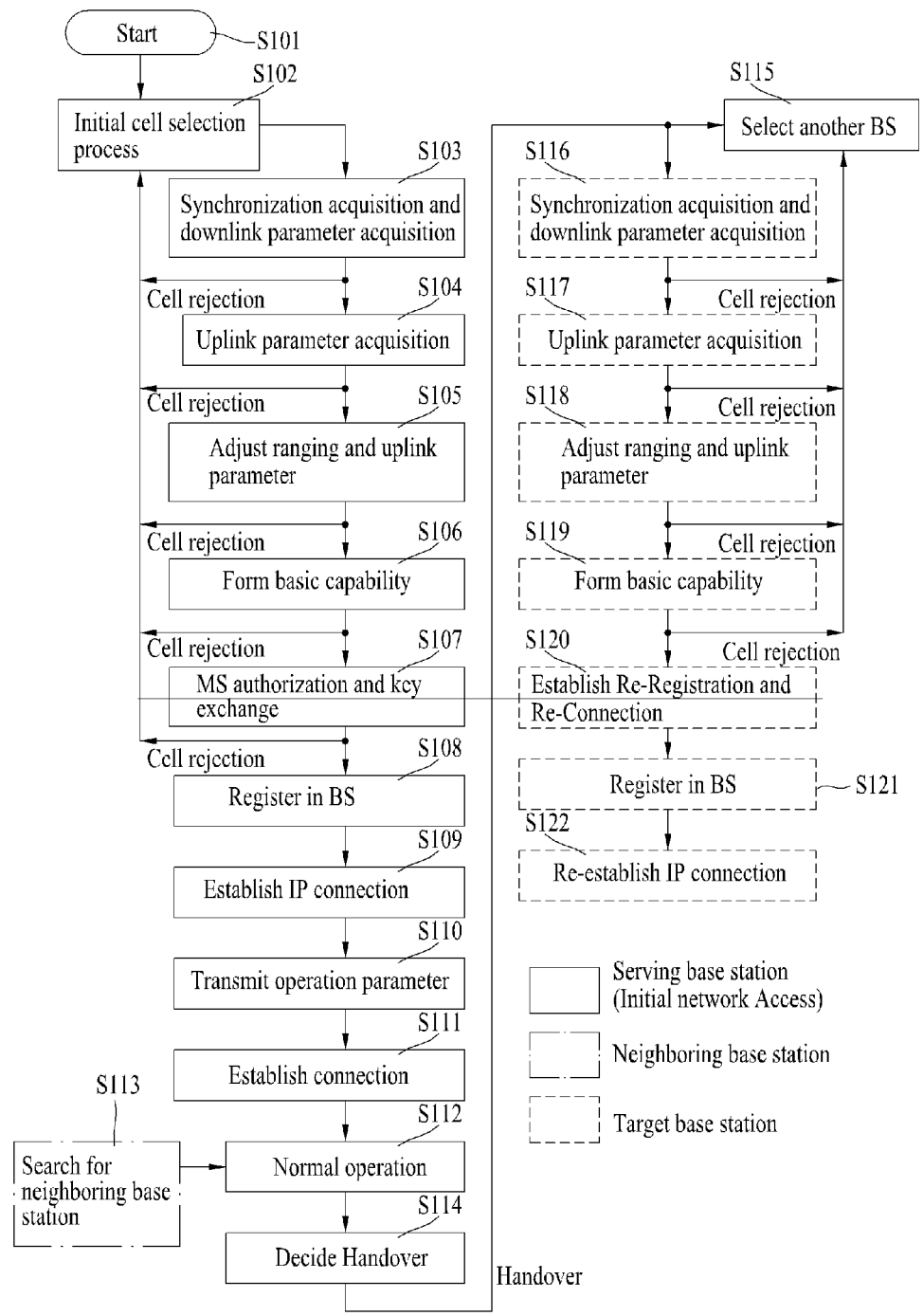
FIG. 1 is a flow chart illustrating a method for performing a handover and initial network entry process.

Reference will now be made in detail to the preferred embodiments of the present invention, examples of which are illustrated in the accompanying drawings.

The following embodiments of the present invention relate to a wireless access system, and relate to a pre-authentication method for an Inter-RAT handover managed by different administrative domains.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with a user equipment (UE), a mobile station (MS), a mobile subscriber station (MSS), and a mobile node (MN) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the technical idea of the present invention can be supported by the standard documents. For all terms used in this disclosure, reference can be made to the standard documents. Especially, the embodiments of the present invention can be supported by at least one of P802.16-2004, P802.16e-2005, and P802.16Rev2 which are standard documents of the IEEE 802.16 system.

Prior to describing the present invention, it should be noted that specific terms disclosed in the present invention are proposed for the convenience of description and better understanding of the present invention, and the use of these specific terms may be changed to another format within the technical scope or spirit of the present invention.

The following embodiments of the present invention relate to a pre-authentication method. According to this pre-authentication method, if a mobile station performs an Inter-RAT handover, the mobile station performs the pre-authentication before being handed over to a target access point for a handover in a link layer, such that a quality of service (QoS) can be less affected by this pre-authentication.

Under a homogeneous communication environment managed by a single management domain, the present invention can support a handover without using the AAA server. However, under a heterogeneous communication environment managed by several administrative domains, the present invention must carry out the handover using the AAA server, because different authentication results may be generated according to an authenticator type and an AAA-server capability. For example, if a handover is generated between an IEEE 802.11 network based on an EAP-based authentication and an IEEE 802.16 network, and two access networks are operated by a single administrative domain, this handover has no problems. However, if the heterogeneous networks are managed by several administrative domains, a handover mechanism having no need for passing through the AAA server of each administrative domain does not exist. Therefore, a flexible and effective authentication mechanism should be defined for a specific case in which heterogeneous networks are managed by several administrative domains.

Therefore, according to the following embodiments of the present invention, if a mobile station is handed over from an IEEE 802.16 wireless access network based on an EAP authentication framework to either an IEEE 802-based wireless access network such as a wireless LAN accommodating an EAP-based authentication framework or a non-IEEE-based wireless access network (e.g., a 3GPP network) which does not select an EAP as a basic authentication framework, the mobile station performs a pre-authentication before performing a link-layer handover toward a target network access point, and establishes keying materials for communication. In other words, according to the present invention, if the mobile station performs a handover between heterogeneous networks (i.e., an Inter-RAT handover), it performs an authentication procedure consuming a long period of time before entering a new access point, such that it can establish a rapid security association for communication.

According to a basic concept of the pre-authentication, the mobile station transmits an authentication request to a current access point and neighboring access points before performing the handover, and receives authentication information from several access points. Namely, according to the pre-authentication method of the present invention, if an Inter-RAT handover occurs by the extension of a conventional concept, the mobile station can be pre-authenticated in a current access network and neighboring target access points. Therefore, at the last step of the pre-authentication, the target access network can acquire keying materials associated with a corresponding mobile station. Also, the mobile station can be pre-authenticated in the target access network having the possibility of a handover, and at the same time can acquire keying materials.

The pre-authentication method according to the embodiments of the present invention is devised for an Inter-RAT handover managed by several administrative domains. Namely, a target network, where a handover from a serving network will be performed, is based on different access techniques based on different administrative domains. Therefore, the serving network and the target network must basically support an Inter-RAT handover operation.

According to this pre-authentication method, before the mobile station gains access to the target network, the mobile station needs to be pre-authenticated and all the access technologies need to support the EAP. The access technologies supporting no EAP authentication frameworks must use an Authentication, Authentication, and Accounting (AAA) server for relaying the above-mentioned access technologies, and a first AAA server of the serving network and a second AAA server of the target network must support the pre-authentication procedure.

According to the embodiments of the present invention, a heterogeneous network may include not only an IEEE 802-based network accommodating an EAP authentication framework having an IEEE 802.16 network but also links prescribed in non-IEEE networks (e.g., 3GPP and 3GPP2 networks). A multi-mode used by the mobile station provides several radio standards, and at the same time supports a connection to one or more radio interfaces.

The IEEE 802.16m system must satisfy requirements for a handover between heterogeneous networks. In this case, either a type of a neighboring network to which a handover will be performed or handover-associated information can be recognized by a multi-mode mobile station having several radio interfaces. Based on the recognized information, the mobile station may request pre-authentication from the target network where a handover will be performed. Also, if the present invention has been successfully carried out, the mobile station can acquire available keying materials from a corresponding network.

The basic capability negotiation of the IEEE 802.16 system is carried out by exchanging SBC-REQ and SBC-RSP messages between the mobile station and the base station, after the ranging has been finished. In this case, the mobile station may notify its own basic capability to the serving network using the SBC-REQ message. In response to the SBC-REQ message, the base station transmits the SBC-RSP message to the mobile station, such that it can inform the mobile station of common capability information between the mobile station and the base station.

In order to perform the pre-authentication method proposed by the present invention, an 'Inter-RAT Re-Authorization Policy Support' parameter may be further contained in each of the SBC-REQ and SBC-RSP messages.

The following Table 5 exemplarily shows amended SBC-REQ and SBC-RSP messages according to the present invention.

TABLE 5

SBC-REQ/RSP{
  Requisite Parameter
  Physical Parameters Supported
  Bandwidth Allocation Support
  Selective Parameter
  Capabilities for construction and transmission of MAC PDUs
  PKM Flow Control
  Authorization Policy Support
  Inter-RAT Pre-Authorization Policy Support
  Maximum Number of Supported Security Association
  Security Negotiation Parameters
  HMAC-CMAC Tuple
}

In Table 5, the 'Inter-RAT Pre-Authorization Policy Support' parameter added to each of the SBC-REQ and SBC-RSP messages defines a pre-authentication policy when the mobile station is handed over to different wireless access networks of other administrative domains. The pre-authentication policy must be negotiated between the mobile station and the base station, and synchronization between the mobile station and the base station must be adjusted by this pre-authentication policy. The 'Inter-RAT Pre-Authorization Policy Support' parameter of the present invention is contained in the encoding process of the SBC-REQ and SBC-RSP messages in the same manner as in a conventional authorization policy support parameter.

If the 'Inter-RAT Pre-Authorization Policy Support' parameter is omitted, the mobile station and the serving network do not support the pre-authentication method. In this case, the mobile station and the base station do not perform the pre-authentication method, such that they perform a general authorization method. In other words, the mobile station and the base station use the IEEE 802.16 security as a basic authorization policy, in which the IEEE 802.16 security uses an X.509 certificate, an RSA public key encryption algorithm, or an EAP. Therefore, if the mobile station is handed over to another access network except for the IEEE 802.16 network, it must be initially authenticated by the AAA server of the target network and must acquire security-associated keying materials.

The following Table 6 exemplarily shows a Type, Length, and Value (TLV) of an 'Inter-RAT Pre-Authorization Policy Support' parameter according to the present invention.

TABLE 6

| Type | Length | Value | Scope |
|---|---|---|---|
|  | 1 | Bit 0: IEEE 802.16m Privacy Supported<br>Bit 1-7: Reserved, shall be set to zero | SBC-REQ,<br>SBC-RSP |

In Table 5, the 'Security Negotiation Parameters' field should include security capability information which must be negotiated before the pre-authorization procedure, when the mobile station perform handover to a heterogeneous network. Therefore, the 'Security Negotiation Parameters' field can be amended as shown in the following Table 7.

The following Table 7 represents a TLV of the 'Security Negotiation Parameters' field used by embodiments of the present invention.

TABLE 7

| Type | Length | Value | Scope |
|---|---|---|---|
| 25 | variable | The compound field contains the subattributes as defined in the table below | SBC-REQ, SBC-RSP |

| Subattribute | Contents |
|---|---|
| PKM Version Support | Version of Privacy Sublayer Supported |
| Authorization Policy Support | Authorization Policy to Support |
| Inter-RAT Pre-Authorization Policy Support | Inter-RAT Pre-Authorization Policy to Support |
| Message Authentication Code Mode | Message Authentication Code Support |

The following Table 8 shows a TLV of the amended 'Inter-RAT Authorization Policy Support' field.

TABLE 8

| Type | Length | Value |
|---|---|---|
| | 1 | Bit #0: RSA-Based Pre-Authorization at Inter-RAT Handover<br>Bit #1: EAP-Based Pre-Authorization at Inter-RAT Handover<br>Bits #2-#7: Reserved, shall be set to 0 |

Referring to FIG. 8, the amended 'Authorization Policy Support' field may indicate whether or not an RSA-based pre-authentication policy can be supported during an Inter-RAT handover, or may indicate whether or not an EAP-based pre-authentication policy can be supported.

The following Table 9 represents a TLV of a 'Privacy Key management (PKM) Version Support' field contained in Table 7.

TABLE 9

| Type | Length | Value |
|---|---|---|
| 25.1 | 1 | Bit #0: PKM Version 1<br>Bit #1: PKM Version 2<br>Bit #2: PKM Version 3<br>Bit #3-7: Shall be set to 0 |

A type of a neighboring network to which a handover will be performed or neighboring network information are carried out by the scanning operation. A start point of the scanning operation or a scanning period may be changed to another according to an implementation of an actual network or its operation policy. It is assumed that the present invention can support multiple modes (i.e., a multi-mode) of the mobile station, such that the mobile station can simultaneously use several radio standards, and at the same time can support a connection to one or more radio interfaces.

In order to implement the embodiments of the present invention, some security requirements are needed. For example, a multi-mode mobile station may use the IEEE 802.16 network-association information for supporting an Inter-RAT handover, and may also use information associated with a 3GPP network except for the IEEE 802.16 network. In case of a heterogeneous network (e.g., 3GPP network) except for the IEEE 802.16 network, security contexts (e.g., private keys), which are shared between the mobile station and the network for a long period of time, must be stably stored in an SIM or UICC card of the mobile station. Also, a non-IEEE network (e.g., 3GPP network) must be associated with the EAP-based AAA server capable of supporting the success or failure of protected authentication. Also, the IEEE 802.16 network must have a roaming agreement for either the 3GPP network or other heterogeneous networks, such that it can interact with the 3GPP network or other heterogeneous networks. Also, information indicating the success or failure of authentication or any security context, which are exchanged between a first AAA server of the serving network and a second AAA server of the target network, must be protected. In other words, authorization-associated information must be safely exchanged between the first and second AAA servers. In addition, in order to protect user identifiers (e.g., IMSI, TMSI), there is no need to expose user identifiers.

In order to perform the pre-authentication procedure for an Inter-RAT handover, a variety of PKM messages (e.g., PKM Request (PKM-REQ) and PKM Response (PKM-RSP) messages) can be carried out.

The following Tables 10~12 represent exemplary PKM messages.

The following Table 10 exemplarily shows PKM MAC messages.

TABLE 10

| Type Value | Message Name | Message Description |
|---|---|---|
| 9 | PKM-REQ | Privacy Key Management Request [SS->BS] |
| 10 | PKM-RSP | Privacy Key Management Response [BS->SS} |

With reference to Table 10, the PKM-REQ message is used when a subscriber station (SS) requests a PKM from a base station (BS). The PKM-RSP message is used when the base station (BS) generates a PKM response in response to the PKM-REQ message.

The following Table 11 exemplarily shows the PKM-REQ message available for the embodiments of the present invention.

TABLE 11

| Syntax | Size | Contents |
|---|---|---|
| PKM-REQ_Message_Format( ){ | | |
|   Management Message Type=9 | 8 bits | |
|   Code | 8 bits | |
|   PKM Identifier | 8 bits | |
|   TLV Encoded Attributes | variable | TLV-Specific |
| } | | |

With reference to Table 11, the 'Management Message Type' parameter has the size of 8 bits, and represents that a corresponding message is the PKM-REQ message. The 'Code' parameter has one byte, and may represent a type of a PKM packet. Upon receiving the PKM-REQ message having improper codes from the subscriber station (SS), the base station (BS) can delete this PKM-REQ message without any change. The 'PKM Identifier' parameter has the length of one byte, such that the subscriber station (SS) can use the 'PKM Identifier' parameter to answer the PKM-REQ message.

The 'TLV Encoded Attributes' parameter indicates attributes of the PKM-REQ message using TLV (Type, Length, Value) information. Therefore, authentication, authorization and key management data can be exchanged between the subscriber station (SS) and the base station (BS) using the 'TLV Encoded Attributes' parameter. Individual PKM packet types have unique compulsory or selective attributes. If the order of attributes contained in the PKM message is not definitely described in PKM attributes, the order of attributes contained in the PKM message may be optionally decided.

The following Table 12 exemplarily shows the PKM-RSP message available for the embodiments of the present invention.

TABLE 12

| Syntax | Size | Contents |
| --- | --- | --- |
| PKM-RSP_Message_Format(){ | | |
| Management Message Type=10 | 8 bits | |
| Code | 8 bits | |
| PKM Identifier | 8 bits | |
| TLV Encoded Attributes | variable | TLV-Specific |
| } | | |

Contents of parameters contained in Table 12 are similar to those of Table 11.

With reference to Table 12, the 'Management Message Type' parameter has the size of 8 bits, and represents that a corresponding message is the PKM-RSP message. The 'Code' parameter may represent a PKM type. If the base station (BS) receives a PKM packet having any improper code from the base station (BS), it may delete the received PKM packet without any change. By the 'PKM Identifier' parameter, the PKM-RSP message of the base station (BS) can be concerned with the PKM-REQ message of the subscriber station (SS). The 'TLV Encoded Attributes' parameter may be adapted to represent attributes of the PKM-RSP message.

The following Table 13 shows a PKM message code added for the pre-authentication method available for the embodiments of the present invention.

TABLE 13

| Code | PKM Message Type | MAC Management Messages |
| --- | --- | --- |
| 0-2 | Reserved | — |
| 3 | SA Add | PKM-RSP |
| 4 | Auth Request | PKM-REQ |
| 5 | Auth Reply | PKM-RSP |
| 6 | Auth Reject | PKM-RSP |
| ... | ... | ... |
| 26 | PKMv2 SA-Addition | PKM-RSP |
| 27 | PKMv2 TEK-Invalid | PKM-RSP |
| 28 | PKMv2 Group-Key-Update-Command | PKM-RSP |
| 29 | PKMv2 EAP Complete | PKM-RSP |
| 30 | PKMv2 Authenticated EAP Start | PKM-REQ |
| 31 | PKMv3 EAP Pre-Auth Start | PKM-REQ |
| 32 | PKMv3 EAP Pre-Auth Transfer | PKM-RSP |
| 33 | PKMv3 Key Request | PKM-RSP |
| 34 | PKMv3 Key Reply | PKM-REQ |
| 35 | PKMv3 Key Reject | PKM-REQ/PKM-RSP |
| 36 | PKMv3 Authenticated EAP Pre-Auth Start | PKM-REQ |
| 37 | PKMv3 Authenticated EAP Pre-Auth Transfer | PKM-REQ/PKM-RSP |
| 38 | PKMv3 EAP Pre-Auth Complete | PKM-RSP |
| 39-255 | Reserved | |

As shown in Table 13, some newly-defined messages are added to the PKM message code. The PKM message code having the code numbers of 0~30 indicates general PKM messages. In this case, the PKM message code numbers for use in the embodiments of the present invention are equal to code numbers of 31~38. Namely, the PKM message codes for use in the present invention are equal to 30th to 38th PKM messages.

A 31-th PKM message code indicates that the PKM message is a 'PKMv3 EAP Pre-auth Start' message, and a 32-th PKM message code indicates a PKM message for a 'PKMv3 EAP-Transfer' for use in the present invention. Also, a 33-th PKM message code may be adapted to represent the PKM message for a 'PKMv3 Key Request'. The 34-th PKM message code is indicative of a PKM message for a Key Reply. The 35-th PKM message code is indicative of a PKM message for a Key Reject. The 36-th PKM message code is indicative of a 'PKMv3 Authenticated EAP Pre-auth Start'. The 37-th message code is indicative of a 'PKMv3 Authenticated EAP Pre-auth Transfer'. The 38 PKM message code is indicative of a 'PKMv3 EAP Pre-auth Complete'.

According to the embodiments of the present invention, a subscriber station (SS) of the serving network may carry out a pre-authentication procedure before being handed over to a target network. Each target network operations and manages a unique AAA server, and an authentication function is contained in the AAA server. A method for performing the pre-authentication among the SS, the serving network, and the AAA server according to the present invention may be classified into an indirect pre-authentication method and a direct pre-authentication method. Namely, the above-mentioned pre-authentication method may be changed according to a variety of methods for controlling a serving AAA server to participate in the pre-authentication signaling.

The indirect pre-authentication method is carried out when the serving network participates in the pre-authentication signaling. The indirect pre-authentication method is needed when an IP communication between the target network and the SS is disallowed due to a security problem. The indirect pre-authentication signaling method can be classified into a signaling method between the subscriber station (SS) and the serving network and another signaling method between the serving network and the target network. In this case, the signaling method between the serving network and the target network may include an AAA server of the serving network and another AAA server of the target network.

The direct pre-authentication method is carried out when the serving network does not participate in the pre-authentication signaling. Requesting the direct pre-authentication indicates that a mobile node (MN) transmits a pre-authentication request to the target network via the serving AAA server, and the serving AAA server serves as a relay for messages without participating in the pre-authentication procedure. Therefore, the pre-authentication signaling may be transferred from the mobile node (MN) to the target AAA server via the serving AAA server.

In the following drawings, a start point of each arrow is indicative of an entity from which each message is transferred, and an end point of each arrow is indicative of another entity of a destination at which each message is received. However, all message transmission paths between entities contained in a mobile terminal or an access network will not be described, and only some message transmission paths between the entities will be selectively described for the convenience of description. Needless to say, it should be note that other unexplained parts will be readily understood with reference to the annexed drawings.

Figure 3:
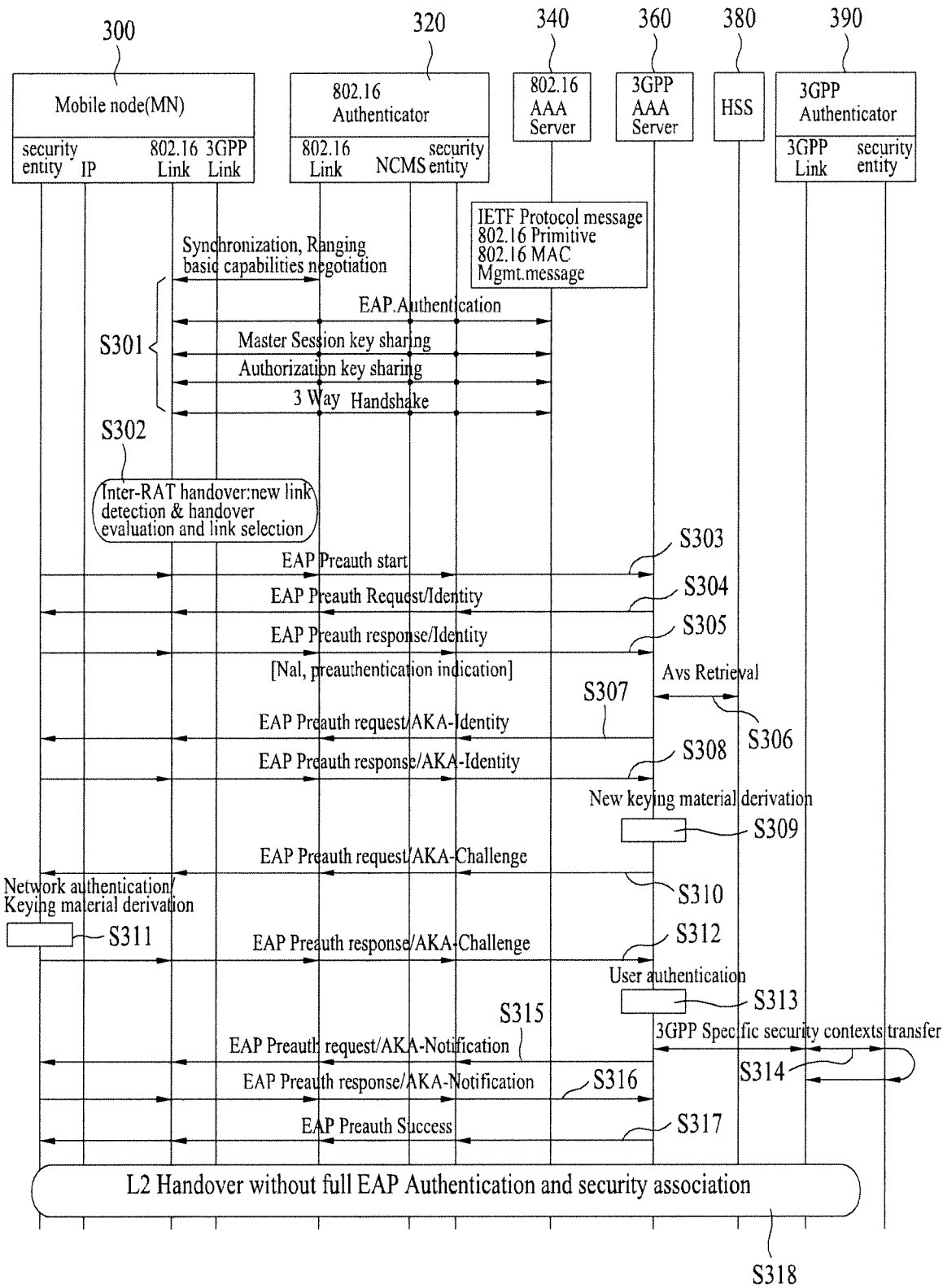
FIG. 3 is a flow chart illustrating a method for allowing a mobile terminal to perform an indirect pre-authentication during an Inter-RAT handover according to one embodiment of the present invention.

FIG. 3 is a flow chart illustrating a method for allowing a mobile terminal to perform an indirect pre-authentication during an Inter-RAT handover according to one embodiment of the present invention.

Referring to FIG. 3, a system according to the present invention may include a mobile node (MN) 300, an IEEE 802.16 authenticator 320 serving as a serving network, an IEEE 802.16 AAA server (802.16 AAA server) 340 serving as a serving AAA server, a 3GPP AAA server 360 serving as a target AAA server, a Home Subscriber Server (HSS) 380 of a target network, and a 3GPP access network 390 serving as a target network.

In this case, the mobile node (MN) 300 may also be called a mobile station (MS) or a mobile terminal, etc. The serving network is indicative of a network which is providing the mobile node (MN) with a service, and the target network is indicative of an objective network to which the mobile node (MN) will be handed over.

In FIG. 3, constituent elements of each system may be comprised of one or more entities. For example, the mobile node (MN) 300 may include a security entity, an IP entity, an 802.16 link entity, and a 3GPP link entity. In this case, the mobile node (MN) 300 includes a UICC/USIM to support an Inter-RAT handover, such that it may use specific information interoperable with the IEEE 802.16 network and information for the 3GPP network.

Also, the serving network (802.16 Authenticator) 320 may include the 802.16 link entity, a Network Control and Management System (NCMS) entity, and a security entity. Also, the target network (3GPP Authenticator) 390 may include the 3GPP link entity and the security entity.

In FIG. 3, a start point of each arrow is indicative of an entity from which each message is transferred, and an end point of each arrow is indicative of another entity of a destination at which each message is received. A transmission path of each message will be described in only characteristic parts of the present invention. Needless to say, it should be noted that other unexplained parts will be readily understood with reference to the annexed drawings.

In FIG. 3, the mobile node (MN) transmits a pre-authentication start message (Pre-Auth Start) to an AAA server of the target network over a current serving network. The target AAA server pre-authenticates the mobile node (MN), and transmits the pre-authentication result to the serving network and the target network. In order to perform the above-mentioned pre-authentication, it is assumed that the present invention uses an EAP-Authentication and Key Agreement (EAP-AKA) method, and a detailed description of the EAP-AKA method will hereinafter be described in detail.

Referring to FIG. 3, at step S301, the mobile node (MN) 300 gains access to the serving network 320, and can perform Master Session Key (MSK) and Authorization Key (AK) sharing processes via an EAP-based authentication and a Traffic Encryption Key (TEK) sharing process via a 3-Way Handshake.

Figure 2:
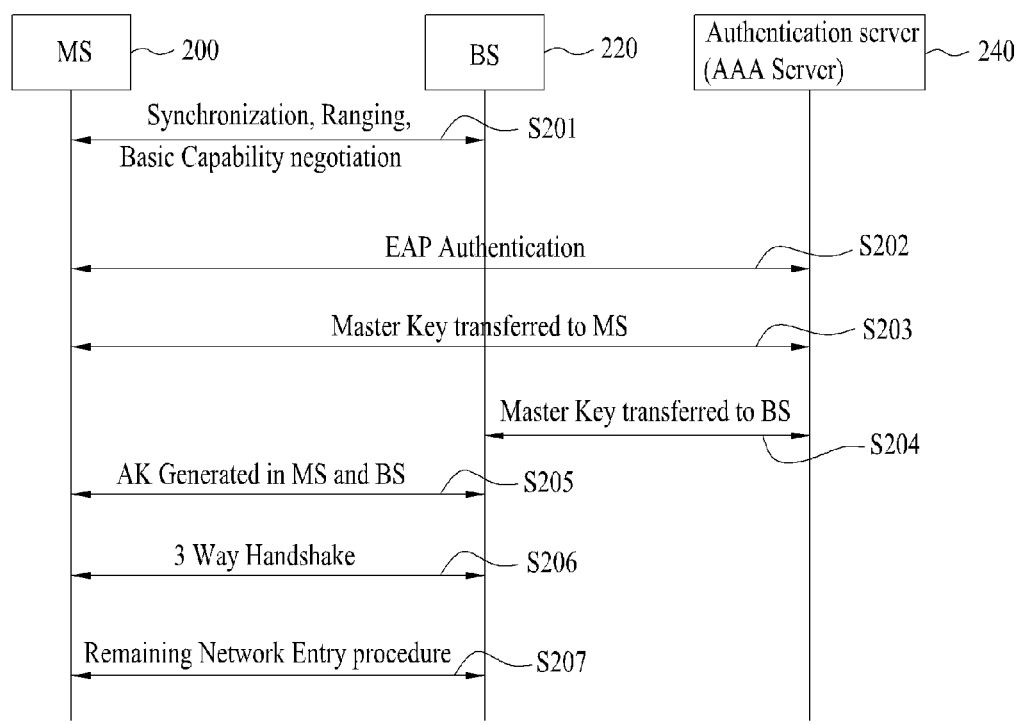
FIG. 2 is a flow chart illustrating a method for allowing a general IEEE 802.16 system to authenticate a mobile station (MS)

The above step S301 is similar to the authentication procedure of FIG. 2, such that a detailed description thereof will be described with reference to FIG. 2. If the serving network is not the IEEE 802.16 network but another IEEE 802-based network, a similar initial authentication procedure based on the EAP can be carried out.

The mobile node (MN) 300, which has carried out the authentication procedure with the serving network, receives signals from a neighboring heterogeneous network by a scanning operation, detects a neighboring network, and selects the detected neighboring network.

By the scanning result of the above step S302, it is assumed that the mobile node (MN) determines a network managed by another administrative domain to be a potential handover target network. In this embodiment, it is assumed that the 3GPP network will be used as the heterogeneous network.

In order to carry out a pre-authentication between the mobile node (MN) and the target network 390, the mobile node (MN) is able to transfer a 'PKM EAP Preauth Start' message to the serving network 320. For example, a security entity acting as an upper entity of the mobile node (MN) 300 transmits a pre-authentication request to the 802.16 link entity, an 802.16 link entity of the mobile node (MN) transmits a pre-authentication request message to an 802.16 link entity of the serving network 320, and an 802.16 link entity of the serving network 320 transmits a pre-authentication request message to a security entity of the serving network 320. Also, the security entity of the serving network 320 may transfer the pre-authentication request message to the AAA server 360 of the target network via the AAA server of the serving network at step S303.

At step S303, the EAP-associated message is encapsulated with a unique protocol of the serving network in the IEEE 802.16 network, and is transferred to the mobile node (MN) via a serving network interface. The EAP message is encapsulated with the AAA protocol in the range from a serving network authenticator to a target network authenticator and a target AAA server, and the encapsulated EAP message is transferred.

The following Table 14 shows attributes of the PKM pre-authentication start (PKM Preauth Start) message available for the above step S303.

TABLE 14

| Attributes | Contents |
| --- | --- |
| Serving Network Identifier | Current Access Network Identifier |
| Serving AS Identifier | Identifier of Current Access Network AAA server |
| Target Network Identifier | Identifier of Target Access Network |
| SS Identifier | International Mobile Subscriber Identity (IMSI) |
| SS MAC Address | MAC Address of Subscriber Station (SS) |
| Security Capabilities | Security Capability such as Authentication Method supported by SS |
| Security Negotiation | Security Capability which should be negotiated before |
| Parameters | Pre-Authentication |
| Key Sequence Number | AK Sequence Number |
| HAMC/CMAC digest | Message Digest calculated by AK |

Table 14 shows a PKM pre-authentication start message for allowing a subscriber station (SS) or a mobile node (MN) to request the pre-authentication. The PKM pre-authentication start message acting as one of PKM messages may include a variety of information (i.e. mobile node information), for example, 'Current Access Network Identifier', 'Identifier of Current Access Network AAA server', 'Identifier of Target Access Network', 'International Mobile Subscriber Identity (IMSI)', 'MAC Address of Subscriber Station', 'Security Capability' supported by the subscriber station (SS), and 'Security Capability to be negotiated before 'Pre-Authentication'.

The target AAA server (3GPP AAA server) 360, which has received the pre-authentication start (Preauth Start) message at step S303, transmits a 'EAP Preauth Request/Identity' message to the serving network 320. Also, the serving network 320 transmits the 'EAP Preauth Request/Identity' message to the mobile node (MN) 300. In this case, the 'EAP Preauth Request/Identity' message is encapsulated with a unique protocol of the serving network 320, and the encapsulated 'EAP Preauth Request/Identity' message is transferred to the mobile node (MN) 300 via the IEEE 802.16 interface.

The mobile node (MN) 300 may transfer its own identifier via an 'EAP Preauth Response/Identity' message. This transferring of the mobile node (MN) identifier is matched with a Network Access identifier (NAI) prescribed in a 3GPP TS 23.003. The 'EAP Preauth Response/Identity' message may include a value defining the pre-authentication, an identifier of a current access network 320, an identifier of the current access network AAA server 340, and an MAC address of the mobile node (MN) 300. The 'EAP Response/Identity' message is transferred from the security entity of the mobile node (MN) 300 to the 802.16 link of the serving network (802.16 Authenticator) 320 via the 802.16 link of the mobile node (MN) 300. Also, the 'EAP Preauth Response/Identity' message passes through the security entity of the serving network and the serving AAA server via the 802.16 link of the serving network, and is then transferred to the target AAA server at step S305.

At step S305, the message is transferred to a neighboring 3GPP AAA server via the current serving AAA server 340 according to a realm part of the NAI, and a transmission path of this message may include one or more AAA servers.

At step S305, the target AAA server (3GPP AAA server) 360 receives an 'EAP Preauth Response/Identity' message having the identifier of the mobile node (MN) 300. In this case, if the target AAA server 360 recognizes the authentication method contained in the 'PKM Preauth Start' message from the mobile node (MN) 300 without recognizing the identifier of the mobile node (MN) 300, the target AAA server 360 may ask the mobile node (MN) 300 to transfer a new identifier using an EAP method defined by the mobile node (MN) 300.

In this case, if the target AAA server 360 recognizes the identifier of the mobile node (MN) 300, it can check the presence or absence of authentication parameters which are unused to perform the EAK-AKA authentication on a corresponding terminal. If there are no authentication parameters, the target AAA server 360 can extract new authentication parameters at step S306.

At step S306, the target AAA server 360 performs mapping on a Temporary Mobile Subscriber Identity (TMSI)/International Mobile Subscriber Identity (IMSI) of the mobile node (MN) 300 and an MAC address. After the authentication is carried out once, the IMSI selected by the EAP-AKA method may be used as an identifier of the mobile node (MN) 300.

The target AAA server 360 may request again the mobile node identifier via the 'EAP Preauth Request/AKA-Identity' message at step S307.

At step S307, the above operation of the 'EAP Preauth Request/AKA-Identity' message is carried out when the mobile node (MN) identifier received via the 'EAP Preauth Response/Identity' message is changed to another by intermediate nodes. If the mobile node (MN) identifier is not changed to another by such intermediate nodes, the operation of the 'EAP Preauth Request/AKA-Identity' message may be omitted. The 'EAP Preauth Request/AKA-Identity' message may be transferred to the mobile node (MN) 300 via the serving network 320.

The mobile node (MN) 300 answers the 'EAP Preauth Request/AKA-Identity' message using the same identifier as that of the 'EAP Preauth Response/Identity' message. In this case, the serving network 320 transmits the 'EAP Preauth Response/AKA-Identity' message to the target AAA server 360, and an identifier contained in the above-mentioned message may be used in the next authentication procedure by the target AAA server 360 at step S308.

The identifier contained in the message of the step S307 may be different from that of the message of the step S308. In this case, a user profile and an authentication profile, which have been extracted from the HSS 380 (or HLR), cannot be used, so that a new profile and a new authentication vector must be extracted from the HSS 380.

The target AAA server 360 generates new keying materials from an Integrity Key (IK) and a Cipher Key (CK). The keying materials are indicative of security-associated contexts requested by the EAP-AKA, and are used to protect unique confidentiality or integrity of the target network (i.e., 3GPP network) technology. Also, a new pseudonym to be allocated to an authenticated user is generated at step S309.

The step S306 may be carried out again before the step S309. The identifier re-requesting steps S307~S308 for performance optimization must be carried out before the user profile and the authentication vector are extracted, when the target AAA server 360 does not has enough information to identify a user as an EAP_AKA user.

The target AAA server 360 includes a Random number (RAND), an Authentication Token (AUTN), a Message Authentication Code (MAC), and a protected pseudonym in an 'EAP Preauth Request/AKA-Challenge' message, and the resultant 'EAP Preauth Request/AKA-Challenge' message may be transferred to the serving network 320. The 'EAP Preauth Request/AKA-Challenge' message can be transferred to the mobile node (MN) 300 over the serving network 30 at step S310.

At step S310, the target AAA server 360 includes the 'Result Indication' parameter in the 'EAP Preauth Request/AKA-Challenge' message, such that the resultant 'EAP Preauth Request/AKA-Challenge' message can be transferred to the mobile node (MN) 300. The 'Result Indication' parameter indicates whether or not a 'Success Result' message will be protected at the end of the authentication procedure. The protection or non-protection of the result message depends upon an operator policy. If the CK and the IK are contained in individual result messages and the resultant messages are transferred to the AAA server 340 of the serving network, additional keying materials are generated by the serving AAA server, such that unique confidentiality or integrity of the serving network can be guaranteed by the additional keying materials.

The mobile node (MN) 300 can carry out an UMTS algorithm contained in its own USIM. A Universal Subscriber Identity Module (USIM) of the mobile node (MN) determines whether or not the AUTN is correct, and performs network authentication according to the determined result. If the AUTN is wrong, the mobile node (MN) 300 fails to perform the authentication. In other words, if the sequence number is not synchronized (i.e., Out-of-Sync), the mobile node (MN) 300 starts performing a synchronization procedure. If the AUTN is correct, the USIM generates an RES, an IK, and a Kc. The mobile node (MN) 300 generates additional keying materials using the 'IK' and 'Kc' values calculated in the USIM, such that the mobile node can check the received MAC using the additional keying materials. Upon receiving the protected pseudonym, the mobile node (MN) stores the received pseudonym to carry out the next authentication procedure at step S311.

After the mobile node (MN) 300 calculates the new MAC value associated with the EAP message using the new keying materials, it transmits the 'EAP Preauth Response/AKA-Challenge' message having the calculated RES and MAC values to the serving network 320. If the mobile node (MN)

300 receives the same 'Result Indication' parameter from the target AAA server 360, this 'Result Indication' parameter is contained in the 'EAP Preauth Response/AKA-Challenge' message. In this case, the 'EAP Preauth Response/AKA-Challenge' message is transmitted to the target AAA server 360 over the serving network 320 at step S312.

The target AAA server 360 inspects the received MAC, and compares with an XRES with the received RES. As a result, the target AAA server 360 can authenticate the mobile node (MN) 300 before the mobile node (MN) 300 performs the handover at step S313.

If all inspections of the step S313 have been successfully carried out, the target AAA server 360 can transmit a '3GPP Specific security context transfer' message to the target network 390 in order to transfer security contexts used in the target network 390 at step S314.

At step S314, security-associated parameters of the target network 390 are transferred from the target AAA server 360 to the target network 390. The security-associated parameters of the target network are indicative of authentication vectors, which have been generated for the corresponding MN at step S311. The security-associated parameters may further include information associated with the IMSI or TMSI of the mobile node (MN), and may be transferred via a Mobile Application Part (MAP) protocol. Unique security-associated parameters of the target network are used when the authentication procedure will be carried out by the target network 390 in future. Not only information transferred via the '3GPP Specific Security Context Transfer' message but also keying materials for protecting either unique confidentiality or integrity of the target network 390 may be additionally contained. The target AAA server 360 transfers the keying materials to the target network 390 via the AAA protocol message. The target network 390 stores the keying materials, such that it uses the stored keying materials to communicate with the mobile node (MN) 300.

If the target AAA server 360 pre-receives a request for using a protected 'Success Result Indication', it may transmit an 'EAP Preauth Request/AKA-Notification' message to the mobile node (MN) over the serving network before transmitting the EAP success message. The 'EAP Preauth Request/AKA-Notification' message can be protected by the MAC at step S315.

In response to the 'EAP Preauth Request/AKA-Notification' message, the mobile node (MN) 300 may transfer the 'EAP Preauth Response/AKA Notification' message to the serving network 320 at step S316.

At step S316, the serving network 320 transfers the 'EAP Preauth Response/AKA Notification' message to the target AAA server, and the target AAA server 360 may disregard contents of this 'EAP Preauth Response/AKA Notification' message.

If the mobile node (MN) 300 has been successfully authenticated in the target network 390, the target AAA server 360 transmits the 'EAP Success' message to the serving network 320. Also, the serving network 320 informs the mobile node (MN) 300 of the success of authentication using the 'EAP Success' message at step S317.

If the 'EAP AKA' procedure has been successfully completed, the mobile node (MN) 300 performs an L2 handover to the target network 390. In this case, the mobile node (MN) can quickly perform the above-mentioned L2 handover on the basis of information pre-exchanged by the pre-authentication between entities of the serving and target networks. In other words, when the mobile node (MN) is registered in the target network 390, its authentication may be newly carried out, and a key setup process may be omitted. If the L2 handover has been completed, an MAC layer of the mobile node (MN) establishes a security association (SA) with an access point and is ready to communicate with the access point at step S318.

Figure 4:
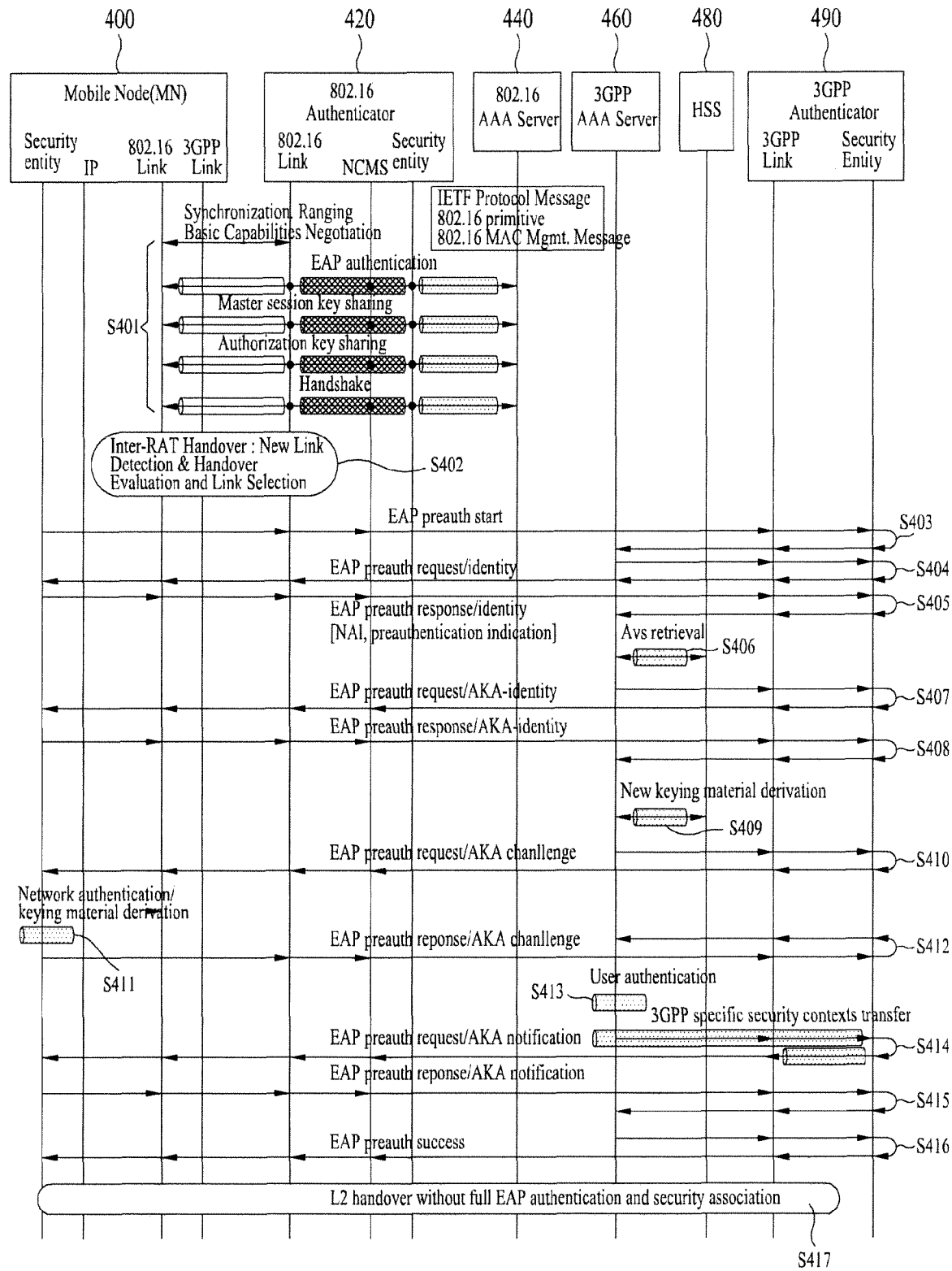
FIG. 4 is a flow chart illustrating a method for allowing a mobile terminal to perform a direct pre-authentication during an Inter-RAT handover according to one embodiment of the present invention.

FIG. 4 is a flow chart illustrating a method for allowing a mobile terminal to perform a direct pre-authentication during an Inter-RAT handover according to one embodiment of the present invention.

Referring to FIG. 4, a system according to the present invention may include a mobile node (MN) 400, an IEEE 802.16 access network (802.16 Authenticator) 420 serving as a serving network, an IEEE 802.16 AAA server (802.16 AAA server) 440 serving as a serving AAA server, a 3GPP AAA server 460 serving as a target AAA server, a Home Subscriber Server (HSS) 480 of a target network, and a 3GPP access network (3GPP Authenticator) 490 serving as a target network.

In this case, the mobile node (MN) 400 may also be called a mobile station (MS) or a mobile terminal, etc. The serving network is indicative of a network which is providing the mobile node (MN) with a service, and the target network is indicative of an objective network to which the mobile node (MN) will be handed over.

In FIG. 4, constituent elements of each system may be comprised of one or more entities. For example, the mobile node (MN) 400 may include a security entity, an IP entity, an 802.16 link entity, and a 3GPP link entity. In this case, the mobile node (MN) 400 includes a UICC/USIM to support an Inter-RAT handover, such that it may use specific information interoperable with the IEEE 802.16 network and information for the 3GPP network.

Also, the serving network 420 may include the 802.16 link entity, a Network Control and Management System (NCMS) entity, and a security entity. Also, the target network 490 may include the 3GPP link entity and the security entity.

FIG. 4 shows an exemplary case in which the mobile node (MN) transmits a direct pre-authentication request to the target network. This requesting the direct pre-authentication indicates that the mobile node (MN) transmits a pre-authentication request to the target network via the serving AAA server, and the serving AAA server serves as a relay for messages without participating in the pre-authentication procedure. In this case, the pre-authentication result may be transferred from the target AAA server to the target network authenticator. Also, it is assumed that the present invention uses the EAP-AKA authentication method to carry out the aforementioned pre-authentication of FIG. 4.

Referring to FIG. 4, an authentication between the mobile node (MN) 400 and the serving network 420 is carried out at step S401. Namely, at step S401, a multi-mode mobile node 400 gains access to the IEEE 802.16 network 420, and can perform a Master Session Key (MSK) and Authentication Key (AK) sharing process via an EAP-based authentication and a TEK sharing process via a 3-Way Handshake.

The above step S401 is similar to the authentication procedure of FIG. 2, such that a detailed description thereof will be described with reference to FIG. 2. Also, if the IEEE 802.16 Authenticator 420 is determined to be another IEEE 802-based network, a similar initial authentication procedure based on the EAP can be carried out.

Thereafter, the mobile node (MN) 400 receives signals from a neighboring network by a scanning operation, detects the neighboring network, and selects the detected neighboring network. By the scanning result, it is assumed that the mobile node (MN) 400 determines the 3GPP network managed by another administrative domain to be a potential handover target network at step S402.

According to another embodiment of the present invention, the mobile node (MN) 400 may directly transfer a 'PKM EAP Preauth Start' message to the 3GPP Authenticator 490. The PKM EAP Preauth Start message comprises mobile node information.

Also, the target network (3GPP Authenticator) 490 may transfer the 'PKM EAP Preauth Start' message received from the mobile node (MN) 400 to the target AAA server 460. This 'PKM EAP Preauth Start' message may include a variety of information (i.e. mobile node information), for example, a mobile node identifier, an MAC address, an authentication method supported by the mobile node, a current access network identifier, an identifier of the current access network AAA server, security capabilities supported by the mobile node, and security capability information to be negotiated before the pre-authentication. In this case, the identifier of the target access network has previously been owned by the mobile node (MN), such that there is no need for the above-mentioned identifier to be contained in the 'PKM EAP Preauth Start' message at step S403.

The EAP Preauth Start message available for the above step S403 may be used in both the IEEE 802.16 network and the 3GPP network. Therefore, the PKM message of Table 14 or general-formatted messages available for the 3GPP network can be used as the Preauth Start message. The mobile node (MN) 400 includes an identifier matched with a network access identifier (NAI) prescribed in the 3GPP TS 23.003 in the 'EAP Preauth Start' message, such that the resultant 'EAP Preauth Start' message can be transferred to the target network 490. The 'EAP Preauth Start' message is transferred to an appropriate target AAA server 460 (e.g., 3GPP AAA server) according to a realm part of the NAI, and a transmission path of this message may include one or more AAA servers. At step S403, the target AAA server 460 may receive the 'EAP Preauth Start' message having the identifier of the mobile node (MN) 400.

After the serving AAA server receives the above 'EAP Preauth Start' message, it may transfer an 'EAP Preauth Request/Identity' message to the mobile node (MN) 400 via the target network authenticator and the serving network authenticator at step S404.

The mobile node (MN) 400 is able to transfer its own identifier to the target AAA server via the 'EAP Preauth Response/Identity' message. In this case, it is assumed that the mobile node identifier satisfies the NAI prescribed in the 3GPP TS 20.003. Besides, a value indicating the pre-authentication, a current access network's identifier, a current access network AAA server's identifier, a target access network's identifier, and a MN's MAC address may be contained in the 'EAP Preauth Response/Identity' message.

The 'EAP Preauth Response/Identity' message may be transferred to the target AAA server 460 via the serving AAA server 440 according to a realm part of the NAI, and its transmission path may include one or more AAA servers. The target AAA server 460 may receive the 'EAP Preauth Response/Identity' packet having the NAI at step S405.

If the target AAA server 460 recognizes the authentication method for the pre-authentication request transferred from the mobile node (MN) without recognizing the mobile node identifier, it may transfer a new identifier to the mobile node (MN) 400 using the authentication method prescribed in the mobile node (MN). If the target AAA server 460 recognizes the identifier of the mobile node (MN) 400, it determines whether or not the received MN identifier includes authentication parameters for AKA authentication. If there are no authentication parameters for the AKA authentication, the target AAA server 460 may transfer the 'Authentication Data Request' message to the HSS 480. As a result, the target AAA server 460 may extract new authentication parameters for the mobile node (MN) 400 from the HSS 480.

Also, upon receiving the 'Authentication Data Request' message from the 3GPP AAA server 460, the HSS 480 may generate new authentication data for two-way authentication. Transmission of the authentication data generated from the HSS 480 may be carried out by a unique MAP protocol of the 3GPP. Also, the HSS 480 performs mapping on the TMSI and IMSI of the mobile node (MN) 400. After the authentication is carried out once, the IMSI selected by the AKA method may be used as an identifier of the mobile node (MN) 400 at step S406.

The 3GPP AAA server may request again the mobile node identifier via the 'EAP Preauth Request/AKA-Identity' message. This requesting action is carried out when the mobile node identifier received via the 'EAP Preauth Response/Identity' message is changed to another by intermediate nodes. If the mobile node identifier is not changed to another by such intermediate nodes, this requesting action may be omitted. The 'EAP Preauth Request/AKA-Identity' message may be transferred to the mobile node via the 3GPP authenticator and the IEEE 802.16 authenticator 420 at step S407.

The mobile node (MN) 400 answers the 'EAP Preauth Request/AKA Identity' message using the same NAI as that of the 'Preauth Response/Identity' message. The IEEE 802.16 network's authenticator may transfer the 'EAP Preauth Response/AKA Identity' message to the 3GPP AAA server via the 3GPP authenticator. The identifier contained in the 'EAP Preauth Response/AKA Identity' message may be used in the next authentication procedure by the 3GPP AAA server at step S408.

If the identifier received via the 'EAP Preauth Request/AKA Identity' message is different from the other identifier received via 'EAP Preauth Response/AKA Identity' message, a user profile and an authentication profile, which have been extracted from the HSS/HLR, cannot be used, so that a new profile and a new authentication vector must be extracted from the HSS/HLR. The step S406 may be carried out again before the step S409. The identifier re-requesting steps S407~S408 for performance optimization must be carried out before the user profile and the authentication vector are extracted, when the 3GPP AAA server does not has enough information to identify a user as an EAP_AKA user.

The 3GPP AAA server generates new keying materials from an Integrity Key (IK) and a Cipher Key (CK). The keying materials are indicative of security-associated contexts requested by the EAP-AKA, and are used to protect unique confidentiality or integrity of the 3GPP network. Also, a new pseudonym to be allocated to an authenticated user is generated.

The 3GPP AAA server 460 includes a Random number (RAND), an Authentication Token (AUTN), a Message Authentication Code (MAC), and a protected pseudonym in the 'EAP Preauth Request/AKA-Challenge' message, and the resultant 'EAP Preauth Request/AKA-Challenge' message may be transferred to the IEEE 802.16 authenticator. The above-mentioned 'EAP Preauth Request/AKA-Challenge' message is transferred to the mobile node (MN) 400 via the authenticator of the 3GPP network and the other authenticator of the IEEE 802.16 network. Also, the 3GPP AAA server transmits a 'Result Indication' parameter to the mobile node (MN). The 'Result Indication' parameter indicates whether or not a 'Success Result' message will be protected at the end of the authentication procedure. The protection or non-protection of this result message depends upon an operator policy. If the CK and the IK are contained in the EAK Preauth Request/

AKA-Challenge' message and the resultant EAK Preauth Request/AKA-Challenge' message is transferred to the IEEE 802.16 AAA server 440, additional keying materials are generated by the IEEE 802.16 AAA server 440, such that unique confidentiality or integrity of the IEEE 802.16 network can be guaranteed by the additional keying materials.

The mobile node (MN) carries out an UMTS algorithm contained in its own USIM. A Universal Subscriber Identity Module (USIM) determines whether or not the AUTN is correct, and performs network authentication according to the determined result. If the AUTN is wrong, the mobile node (MN) fails to perform the authentication. In other words, if the sequence number is not synchronized, the mobile node (MN) starts performing a synchronization procedure. If the AUTN is correct, the USIM generates an RES, an IK, and a CK. The mobile node (MN) generates additional keying materials using the 'IK' and 'Kc' values calculated in the USIM, such that it can check the received MAC using the additional keying materials. Upon receiving the protected pseudonym, the mobile node (MN) stores the received pseudonym to carry out the next authentication procedure at step S411.

After the mobile node (MN) calculates the new MAC value associated with the EAP message using the new keying materials, it transmits the 'EAP Preauth Response/AKA-Challenge' message having the calculated RES and MAC values to the IEEE 802.16 authenticator. If the mobile node (MN) receives the same 'Result Indication' parameter from the 3GPP AAA server 460, this 'Result Indication' parameter is contained in the 'EAP Preauth Response/AKA-Challenge' message. Otherwise, if the mobile node (MN) does not receive the same 'Result Indication' parameter from the AAA server 460, the 'Result Indication' parameter is not contained in the 'EAP Preauth Response/AKA-Challenge' message. The 'EAP Preauth Response/AKA-Challenge' packet is transmitted to the 3GPP AAA server 460 via the IEEE 802.16 authenticator 420 and the 3GPP authenticator 490 at step S412.

The 3GPP AAA server 460 inspects the received MAC, and compares with an XRES with the received RES, such that it performs user authentication at step S413.

Provided that the 3GPP AAA server 460 pre-receives a request for using a protected 'Success Result Indication', if all inspections of the step S413 have been successfully carried out, the 3GPP AAA server 460 transmits an 'EAP Preauth Request/AKA-Notification' message before transmitting the EAP success message. The 'EAP Preauth Request/AKA-Notification' message is protected by the MAC. Also, unique security-associated parameters of the 3GPP network are transferred from the 3GPP AAA server to the 3GPP authenticator. The security-associated parameters are indicative of authentication vectors, which have been generated for the corresponding MN at step S406, may further include information associated with the IMSI or TMSI of the mobile node (MN), and may be transferred via a Mobile Application Part (MAP) protocol. The above unique security-associated parameters are used when the authentication procedure will be carried out by the 3GPP network in future. The 'EAP Preauth Request/AKA-Notification' message may include not only security information but also keying materials generated for protecting either unique confidentiality or integrity of the 3GPP network. The 3GPP AAA server 460 transmits the 'EAP Preauth Request/AKA-Notification' message to the 3GPP authenticator via the authentication protocol message. The 3GPP authenticator stores the security-associated parameters and the keying materials, and may use the stored information to communicate with the authenticated mobile node at step S414.

In response to the 'EAP Preauth Request/AKA-Notification' message, the mobile node (MN) may transfer the 'EAP Preauth Response/AKA-Notification' message to the IEEE 802.16 authenticator 420. The IEEE 802.16 authenticator 420 transfers the 'EAP Preauth Response/AKA-Notification' message to the 3GPP AAA server 460 via the 3GPP authenticator 490, and the 3GPP AAA server 460 may disregard contents of this 'EAP Preauth Response/AKA-Notification' message at step S415.

The 3GPP AAA server 460 transfers the EAP success message to the IEEE 802.16 authenticator 420. The EAP success message is transferred to the IEEE 802.16 authenticator 420 via the 3GPP authenticator 490. The IEEE 802.16 authenticator 420 informs the mobile node (MN) of the success of authentication using the 'EAP Preauth Success' message. If the EAP AKA procedure has been successfully completed, the mobile node (MN) and the 3GPP network share the authentication vectors and the keying materials after performing the L2 handover, such that the mobile node (MN) can stably communicate with and the 3GPP network at step S416.

The mobile node (MN), which has performed the pre-authentication procedure with the target network 490 at steps S403~S410, can perform the L2 handover to the target network 490. Therefore, after the above handover, a new authentication procedure and a key setup procedure between the mobile node (MN) and the target network may be omitted. If the L2 handover (i.e., a second layer (L2) handover), the MAC of the mobile node (MN) 400 establishes a security association (SA) with an access point of the target network 490, and is ready to communicate with the access point at step S417.

Figure 5:
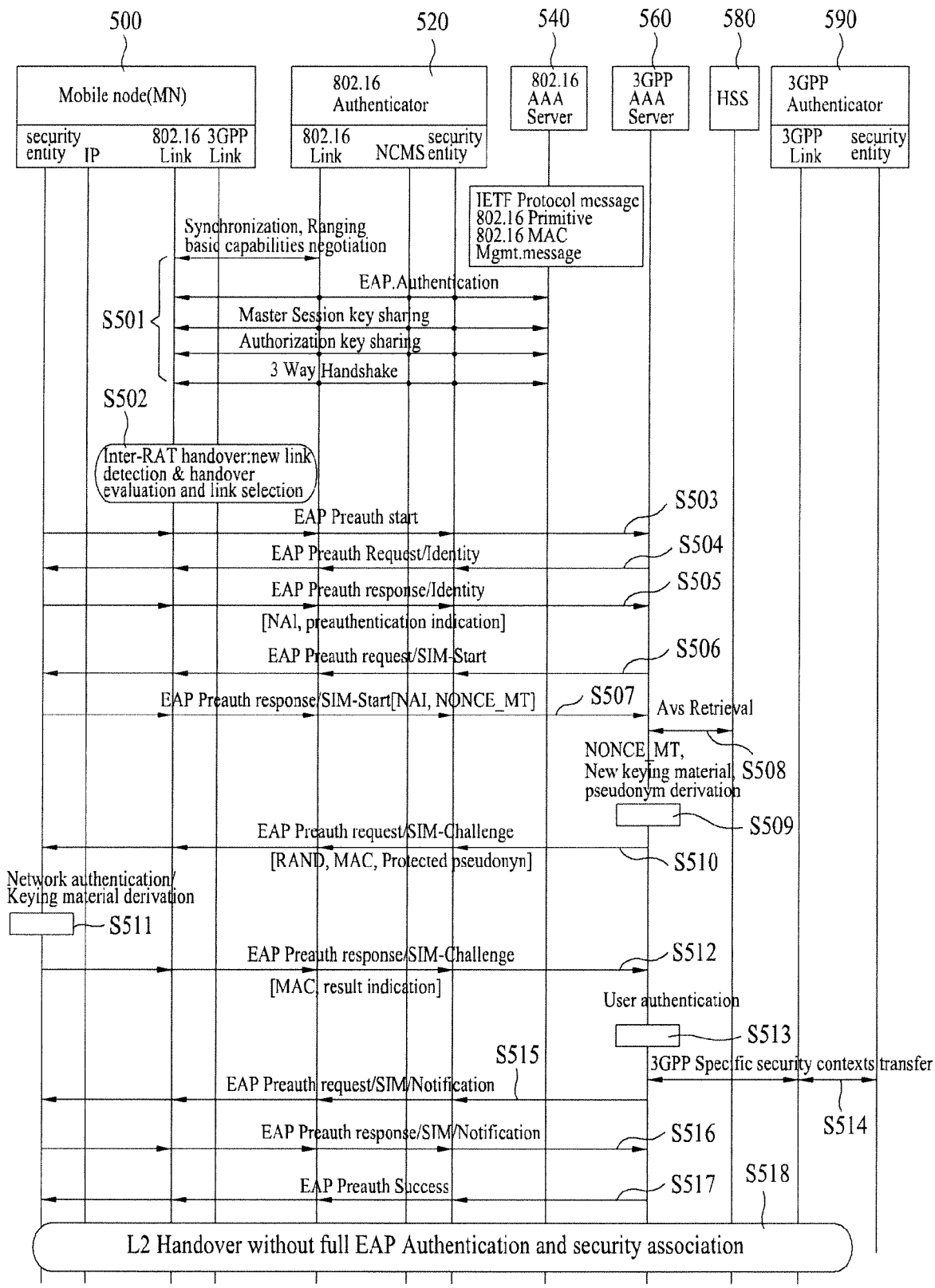
FIG. 5 is a flow chart illustrating a method for allowing a mobile terminal to perform an indirect pre-authentication during an Inter-RAT handover according to still another embodiment of the present invention.

FIG. 5 is a flow chart illustrating a method for allowing a mobile terminal to perform an indirect pre-authentication during an Inter-RAT handover according to still another embodiment of the present invention.

Referring to FIG. 5, a system according to the present invention may include a mobile node (MN) 500, an IEEE 802.16 access network (802.16 Authenticator) 520 serving as a serving network, an IEEE 802.16 AAA server 540 serving as a serving AAA server, a 3GPP AAA server 560 serving as a target AAA server, a Home Subscriber Server (HSS) 580 of a target network, and a 3GPP access network (3GPP Authenticator) 590 serving as a target network. In this case, the mobile node (MN) 500 may also be called a mobile station (MS) or a mobile terminal, etc. The serving network is indicative of a network which is providing the mobile node (MN) with a service, and the target network is indicative of an objective network to which the mobile node (MN) will perform handover.

In FIG. 5, constituent elements of each system may be comprised of one or more entities. For example, the mobile node (MN) 500 may include a security entity, an IP entity, an 802.16 link entity, and a 3GPP link entity. In this case, the mobile node (MN) 500 includes a UICC/USIM to support an Inter-RAT handover, such that it may use specific information interoperable with the IEEE 802.16 network and information for the 3GPP network.

Also, the serving network 520 may include the 802.16 link entity, a Network Control and Management System (NCMS) entity, and a security entity. Also, the target network 590 may include the 3GPP link entity and the security entity.

In FIG. 5, a start point of each arrow is indicative of an entity from which each message is transferred, and an end point of each arrow is indicative of another entity of a destination at which each message is received. A transmission path of each message will be described in only characteristic parts of the present invention. Needless to say, it should be noted that other unexplained parts will be readily understood with reference to the annexed drawings.

According to another embodiment of the present invention, the mobile node (MN) 500 may transfer a preauth request start message to the target AAA server 560 via the serving AAA server 540. The target AAA server 540, which has received the preauth request message, may perform pre-authentication on the mobile node (MN) 500, and may transfer the pre-authentication result to the serving network 520 and the target network 590. In this case, the target network 590 may transfer keying materials to be used by the target network to the mobile node (MN) 500, wherein the keying materials are used as the pre-authentication result. Also, according to another embodiment, it is assumed that the EAP-SIM authentication method is used for the pre-authentication.

Referring to FIG. 5, at step S501, a multi-mode mobile node 500 gains access to the IEEE 802.16 network 520 acting as the serving network, and can perform a Master Session Key (MSK) and Authentication Key (AK) sharing process via an EAP-based authentication and a TEK sharing process via a 3-Way Handshake. If the serving network 520 is determined to be another IEEE 802-based network instead of the IEEE 802.16 network, a similar initial authentication procedure based on the EAP can be carried out.

Thereafter, the mobile node (MN) 500 receives signals from a neighboring network by a scanning operation, performs network detection, and selects the detected network. As a result, it is assumed that the mobile node (MN) 500 determines a network managed by another administrative domain to be a target network acting as a potential handover target network. According to another embodiment of the present invention, it is assumed that the target network is determined to be the 3GPP network at step S502.

The mobile node (MN) 500 may transfer the 'EAP Preauth Start' message to the IEEE 802.16 network 520. Also, the serving network 520 may transfer the 'EAP Preauth Start' message to the target AAA server 560. In this case, the 'EAP Preauth Start' message may also be set to the 'EAP Preauth Start' message of Table 14. Therefore, the 'EAP Preauth Start' message may include a mobile node (MN) identifier and an MAC address. Also, the 'EAP Preauth Start' message may include a variety of information, for example, an authentication method supported by the mobile node, a current access network identifier, an identifier of the current access network AAA server, a target access network identifier, security capabilities supported by the mobile node, and security capability information to be negotiated by the mobile node at step S503.

In order to request parameters needed for authenticating the mobile node (MN) 500, the target AAA server 560 may transfer the 'EAP Preauth Request/Identity' message to the serving network 520. Also, the serving network 520 may transfer the 'EAP Preauth Request/Identity' message to the mobile node (MN) 500. EAP packets may be encapsulated with a unique protocol of the serving network (e.g., IEEE 802.16 network) 520, and the encapsulated EAP packets may be transferred via the IEEE 802.16 interface at step S504.

The mobile node (MN) 500 may transfer its own identifier via the 'EAP Preauth Response/Identity' message. In this case, the mobile node (MN) identifier is matched with a Network Access identifier (NAI) prescribed in the 3GPP TS 23.003. Besides, the 'EAP Preauth Response/Identity' message may include a value defining the pre-authentication, an identifier of a current access network, an identifier of the current access network AAA server, a target access network identifier, and an MAC address of the mobile node (MN). The 'EAP Preauth Response/Identity' message is transferred to the target AAA server (3GPP AAA server) 560. The 'EAP Preauth Response/Identity' message is transferred to an appropriate target AAA server 560 via the current serving AAA server 540 according to a realm part of the NAI, and a transmission path of this message may include one or more AAA servers at step S505.

At step S505, the target AAA server 560 receives an 'EAP Preauth Response/Identity' message having the identifier of the mobile node (MN) 500. In this case, if the target AAA server 560 recognizes the authentication method contained in the preauth request message transferred from the mobile node (MN) 500 without recognizing the identifier of the mobile node (MN) 500, the target AAA server 560 may ask the mobile node (MN) 300 to transfer a new identifier using an EAP method defined by the mobile node (MN) 500. The target AAA server (3GPP AAA server) 560 may request again the mobile node identifier via the 'EAP Preauth Request/SIM Start' message at step S506.

At step S506, the above-mentioned action for requesting the mobile node identifier using the 'EAP Request/SIM Start' message in the target AAA server may be carried out when the mobile node (MN) 500's identifier is changed to another by intermediate nodes. If the identifier of the mobile node (MN) 500 is not changed to another, the step S506 may be omitted. The 'EAP Preauth Response/Identity' message is transferred to the mobile node (MN) over the IEEE 802.16 network.

The mobile node (MN) 500 selects a new random number (NONCE_MT), and this 'NONCE_MT' can be used to perform network authentication. The mobile node (MN) 500 includes the same identifier and 'NONCE_MT' as those of the 'EAP Preauth Response/Identity' message in the 'EAP Preauth Response/SIM-Start' message, and the resultant 'EAP Preauth Response/SIM-Start' message may be transferred to the serving network 520. The serving network 520 transmits the 'EAP Preauth Response/SIM-Start' message to the target AAA server 560, and the identifier contained in the 'EAP Preauth Response/SIM-Start' message may be used in the next authentication procedure by the target AAA server 560 at step S507.

If the identifier contained in the message of the step S506 may be different from that of the message of the step S507, a user profile and an authentication profile, which have been extracted from the HSS (or HLR) 580, cannot be used, so that a new profile and a new authentication vector must be extracted from the HSS (or HLR).

The target AAA server 560 determines the presence or absence of N authentication parameters for EAP-SIM authentication on the mobile node (MN) 500. If the absence of N authentication parameters is determined, the target AAA server 560 extracts a series of new authentication parameters from the HSS/HLR. Also, the target AAA server 560 performs mapping on a TMSI, an IMSI, and an MAC address. After the authentication is carried out once, the temporary identifier selected by the EAP-AKA method may be used as an identifier of the mobile node (MN) at step S508.

Although the above step S508 is carried out after the serving network 520 has transmitted the 'EAP Preauth Response/SIM-Start' message to the target AAA server 560 at step S507, it should be noted that this step S508 may also be carried out after the lapse of Step S506 or S509.

The target AAA server 560 may generate new keying materials from the 'NONCE_MT' parameter and N new ciphering keys (Kc). The keying materials are indicative of security-associated contexts requested by the EAP-SIM, and are used to protect unique confidentiality or integrity of the 3GPP technology. Also, a new pseudonym to be allocated to an authenticated user is generated. The pseudonym is encrypted by the keying materials generated by the EAP-SIM, and its integrity is protected. In the meantime, a Message Authentication Code (MAC) is calculated on the EAP message using keys generated by the EAP-SIM, such that the calculated MAC may be used as a network authentication value at step S509.

The target AAA server 560 loads the RAND, MAC, and protected pseudonym on the 'EAP Preauth Request/SIM-Challenge' message, such that the resultant 'EAP Preauth Request/SIM-Challenge' message is transferred to the serving network 520. The 'EAP Preauth Request/SIM-Challenge' message is transferred to the mobile node (MN) 500 over the serving network 520. Also, the target AAA server 560 includes a 'Result Indication' parameter in the 'EAP Preauth Request/SIM-Challenge' message, such that the resultant 'EAP Preauth Request/SIM-Challenge' message may be transferred to the mobile node (MN). The 'Result Indication' parameter indicates whether or not a 'Success Result' message will be protected at the end of the authentication procedure. The protection or non-protection of the result message depends upon an operator policy. If the target AAA server 560 includes the 'Kc' value in the 'EAP Preauth Request/SIM-Challenge' message and transmits the resultant 'EAP Preauth Request/SIM-Challenge' message to the AAA server 540 of the serving network, additional keying materials are generated by the serving AAA server 540, such that unique confidentiality or integrity of the serving network 520 can be guaranteed by the additional keying materials at step S510.

The mobile node (MN) 500 performs a GSM A3/A8 algorithm contained in the SIM on each of received RANDs several times (i.e., N times), such that N SRESs and Kc values can be generated. The mobile node (MN) 500 may generate additional keying materials from N Kc and NONCE_MT values. The mobile node (MN) 500 calculates a network authentication MAC using the newly-generated keying materials, and determines whether the calculated network authentication MAC is equal to the received MAC. If the MAC is wrong, the network authentication is failed, and the mobile node (MN) 500 cancels this authentication. If the MAC is correct, the mobile node (MN) 500 continuously performs the authentication procedure. The mobile node (MN) 500 may calculate a new MAC on the EAP message having the N SRESs using new keying materials. Upon receiving the protected pseudonym, the mobile node (MN) 500 stores the received pseudonym for future authentication at step S511.

The mobile node (MN) 500 may transfer the 'EAP Preauth Response/SIM Challenge' message having the calculated RES and MAC values to the serving network 520. Upon receiving the same indication parameter from the target AAA server 560, the mobile node (MN) 500 includes the 'Result Indication' parameter in the 'EAP Preauth Response/SIM-Challenge' message. If the same indication parameter is not received from the target AAA server, the mobile node (MN) 500 does not include the 'Result Indication' Parameter in the 'EAP Preauth Response/SIM-Challenge' message. The serving network 520 may transfer the 'EAP Preauth Response/SIM-Challenge' message to the target AAA server 560 at step S512.

The target AAA server 560 compares its own Response MAC with the received MAC, such that it can perform user authentication at step S513.

Unique security-associated parameters of the target AAA server 560 may be transferred from the target AAA server 560 to the target network 590. The unique security-associated parameters are indicative of authentication vectors, which have been generated for the corresponding MN at step S511. The security-associated parameters may further include IMSI- or TMSI-associated information, and may be transmitted or received via a Mobile Application Part (MAP) protocol. The security-associated parameters are used when the authentication procedure will be carried out by the target network (e.g., 3GPP network) in future. Not only information transferred via the '3GPP Specific Security Context Transfer' message but also keying materials for protecting either unique confidentiality or integrity of the target network (e.g., 3GPP network) may be additionally contained. The target AAA server 560 transfers a specific '3GPP Specific Security Context Transfer' message to the target network via the AAA protocol message. The network stores the keying materials, such that it uses the stored keying materials to communicate with the authenticated mobile node (MN) at step S514.

If the comparison result was successful at step S513, the target AAA server (i.e., 3GPP AAA server) 560 may pre-request the target network 590 to use the 'Success Result Indication' parameter. In this case, the 3GPP AAA server 560 transmits an 'EAP Preauth Request/SIM-Notification' message before transmitting the 'EAP Preauth Success' message, and this 'EAP Preauth Request/SIM-Notification' message can be protected by the MAC at step S515.

In response to the 'EAP Preauth Request/SIM-Notification' message, the mobile node (MN) 500 may transfer an 'EAP Preauth Response/SIM-Notification' message to the serving network 520. The serving network 520 transfers the 'EAP Preauth Response/SIM-Notification' message to the 3GPP AAA server 560 at step S516.

However, at step S516, the 3GPP AAA server 560 may disregard contents of the 'EAP Preauth Response/SIM-Notification' message.

If the pre-authentication between the mobile node (MN) 500 and the 3GPP AAA server 560 has been successfully carried out, the 3GPP AAA server 560 may transfer the 'EAP Preauth Success' message to the serving network 520. The serving network 520 transmits the 'EAP Preauth Success' message to the mobile node (MN) 500, such that it may inform the mobile node (MN) 500 of the successful pre-authentication at step S517.

If the EAP SIM authentication procedure has been successfully completed, the mobile node (MN) and the 3GPP network share the authentication vectors and the keying materials, and the mobile node (MN) can stably communicate with and the target network. Namely, the mobile node (MN) 500 may perform an L2 handover to the target network at step S518.

At step S518, as the pre-authentication result of the steps S514~S517, when network entities of the serving and target networks 520 and 590 are registered in the target network on the basis of their communication information, they may omit a new authentication process and a new key setup process. If the L2 handover (i.e., second-layer handover) is completed, the MAC of the mobile node (MN) 500 establishes a security association (SA) with an access point of the target network 560, and is ready to communicate with the access point.

Figure 6:
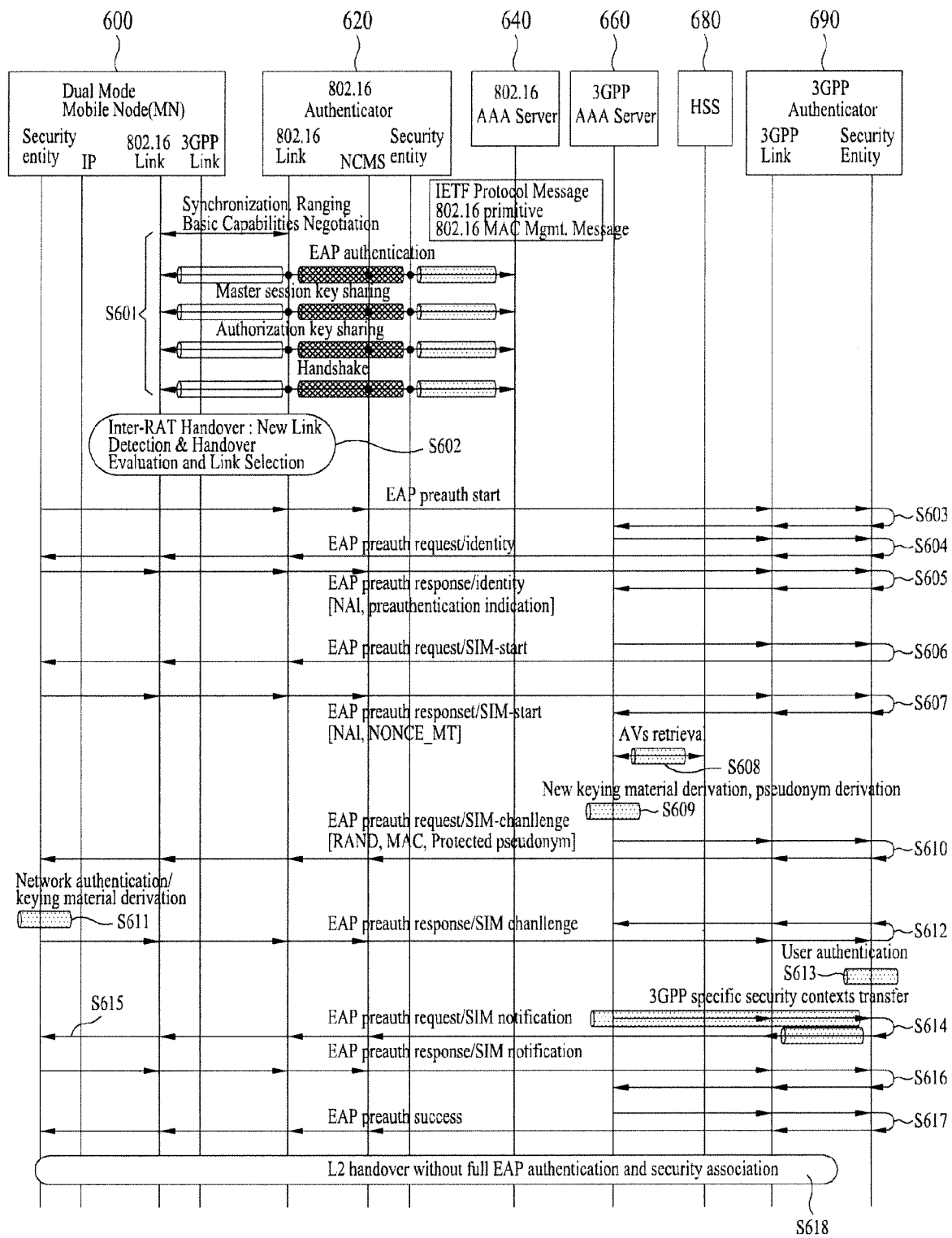
FIG. 6 is a flow chart illustrating a method for allowing a mobile terminal to perform a direct pre-authentication during an Inter-RAT handover according to still another embodiment of the present invention.

FIG. 6 is a flow chart illustrating a method for allowing a mobile terminal to perform a direct pre-authentication during an Inter-RAT handover according to still another embodiment of the present invention.

Referring to FIG. 6, a system according to the present invention may include a mobile node (MN) 600, an IEEE 802.16 access network (802.16 Authenticator) 620 serving as a serving network, an IEEE 802.16 AAA server 640 serving as a serving AAA server, a 3GPP AAA server 660 serving as a target AAA server, a Home Subscriber Server (HSS) 680 of a target network, and a 3GPP access network (3GPP Authenticator) 690 serving as a target network. In this case, the mobile node (MN) 500 may also be called a mobile station (MS) or a mobile terminal, etc. The serving network is indicative of a network which is providing the mobile node (MN) with a service, and the target network is indicative of an objective network to which the mobile node (MN) will perform handover.

In FIG. 6, constituent elements of each system may be comprised of one or more entities. For example, the mobile node (MN) 600 may include a security entity, an IP entity, an 802.16 link entity, and a 3GPP link entity. In this case, the mobile node (MN) 600 includes a UICC/USIM to support an Inter-RAT handover, such that it may use specific information interoperable with the IEEE 802.16 network and information for the 3GPP network.

Also, the serving network 620 may include the 802.16 link entity, a Network Control and Management System (NCMS) entity, and a security entity. Also, the target network 690 may include the 3GPP link entity and the security entity.

In FIG. 6, a start point of each arrow is indicative of an entity from which each message is transferred, and an end point of each arrow is indicative of another entity of a destination at which each message is received. A transmission path of each message will be described in only characteristic parts of the present invention. Needless to say, it should be noted that other unexplained parts will be readily understood with reference to the annexed drawings.

FIG. 6 shows an exemplary case in which the mobile node (MN) transmits a direct pre-authentication request to the target network. This requesting the direct pre-authentication indicates that the mobile node (MN) transmits a pre-authentication request to the target network via the serving AAA server, and the serving AAA server serves as a relay for messages without participating in the pre-authentication procedure. In this case, the pre-authentication result may be transferred from the target AAA server to the target network. Also, the pre-authentication result may be directly transferred to the mobile node (MN) via the serving authentication server. Also, it is assumed that the present invention uses the EAP-AKA authentication method to carry out the aforementioned pre-authentication of FIG. 6.

Referring to FIG. 6, at step S601, a multi-mode mobile node 600 gains access to the serving network (i.e., the IEEE 802.16 network) 620, and can perform a Master Session Key (MSK) and Authentication Key (AK) sharing process via an EAP-based authentication and a TEK sharing process via a 3-Way Handshake. If the serving network 620 is determined to be another IEEE 802-based network instead of the serving network, a similar initial authentication procedure based on the EAP can be carried out at step S601.

Thereafter, the mobile node (MN) 600 receives signals from a neighboring network by the scanning operation, performs network detection, and selects the detected network. By this scanning result, it is assumed that the mobile node (MN) 600 determines a network managed by another administrative domain to be a target network acting as a potential handover target network at step S602.

The mobile node (MN) 600 may directly transfer an 'EAP Preauth Start' message to the 3GPP network 690. The 'EAP Preauth Start' message may include a variety of information, for example, a mobile node identifier, an MAC address, an authentication method supported by the mobile node, a current access network identifier, an identifier of the current access network AAA server, security capabilities supported by the mobile node, and security capability information to be negotiated before the pre-authentication at step S603.

At step S603, the identifier of the target access network has previously been owned by the mobile node (MN), such that there is no need for the above-mentioned mobile node identifier to be contained in the 'EAP Preauth Start' message. The 'EAP Preauth Start' message is not used as the PKM message of FIG. 14, and can be available for the 3GPP network. The mobile node (MN) 600 transmits an identifier matched with a network access identifier (NAI) prescribed in the 3GPP TS 23.003 to the target access network 690. The 'EAP Preauth Start' message is transferred to an appropriate 3GPP AAA server according to a realm part of the NAI, and a transmission path of this message may include one or more AAA servers. Namely, the target AAA server 660 may receive the 'EAP Preauth Start' message having the identifier of the mobile node (MN) 600 from the target network 690.

The target AAA server 660 may transfer an 'EAP Preauth Request/Identity' message to the mobile node (MN) via the target network authenticator 690 and the serving network authenticator 620 at step S604.

The mobile node (MN) 600 is able to transfer its own identifier to the target AAA server 660 via the 'EAP Preauth Response/Identity' message. In this case, it is assumed that the mobile node identifier satisfies the NAI prescribed in the 3GPP TS 20.003. The 'EAP Preauth Response/Identity' message may include a value indicating the pre-authentication, a current access network's identifier, a current access network AAA server's identifier, a target access network's identifier, and a MN's MAC address. The 'EAP Preauth Response/Identity' message may be transferred to the target AAA server 660 according to a realm part of the NAI, and its transmission path may include one or more AAA servers at step S605.

The target AAA server 660 may receive the 'EAP Preauth Response/Identity' packet having the NAI. If the target AAA server 660 recognizes the authentication method for the pre-authentication request transferred from the mobile node (MN) 600 without recognizing the mobile node identifier, it may transfer a new identifier to the mobile node (MN) 600 using the authentication method (e.g., EAP-SIM) prescribed in the mobile node (MN). For example, the 3GPP AAA server may request again the mobile node identifier via the 'EAP Preauth Request/SIM Start' message. This requesting action is carried out when the mobile node identifier received via the 'EAP Preauth Response/Identity' message is changed to another by intermediate nodes. If the mobile node identifier is not changed to another by such intermediate nodes, this requesting action may be omitted. The 'EAP Preauth Response/Identity' message may be transferred to the mobile node via the IEEE 802.16 authenticator 620 at step S606.

The mobile node (MN) 600 selects a new random number (NONCE_MT), and this 'NONCE_MT' can be used to perform network authentication. The mobile node (MN) 600 includes the same identifier and 'NONCE_MT' as those of the 'EAP Preauth Response/Identity' message in the 'EAP Preauth Response/SIM-Start' message, and the resultant 'EAP Preauth Response/SIM-Start' message may be transferred to the IEEE 802.16 authenticator 620. The IEEE 802.16 authenticator 620 transmits the 'EAP Preauth Response/SIM-Start' message to the 3GPP AAA server 660 via the 3GPP authenticator 690. The identifier contained in the 'EAP Preauth Response/SIM-Start' message may be used in the next authentication procedure by the 3GPP AAA server. If the identifier contained in the 'EAP Preauth Response/Identity' message may be different from that of the 'EAP Preauth Response/SIM-Start' message, a user profile and an authentication profile, which have been extracted from the HSS (or HLR), cannot be used. Therefore, the 3GPP AAA server extracts a new profile and a new authentication vector from the HSS (or HLR) at step S607.

The 3GPP AAA server 660 determines the presence or absence of N authentication parameters which have not been used for EAP-SIM authentication by the mobile node (MN) 600. If the absence of the N authentication parameters is determined, the 3GPP AAA server 660 extracts a series of new authentication parameters from the HSS/HLR 680. Also, the 3GPP AAA server 660 may also perform mapping on a TMSI, an IMSI, and an MAC address. After the authentication is carried out once, the temporary identifier selected by the EAP-SIM may be used as an identifier of the mobile node (MN) at step S608.

Although the above step S608 is carried out after the IEEE 802.16 authenticator 620 has transmitted the 'EAP Preauth Response/SIM-Start' message to the 3GPP AAA server 660 via the 3GPP authenticator 690, it should be noted that this step S608 may also be carried out after the lapse of Step S606 or S609.

The 3GPP AAA server 660 may generate new keying materials from the 'NONCE_MT' parameter and N new Kc values. The keying materials are indicative of security-associated contexts requested by the EAP-SIM, and are used to protect unique confidentiality or integrity of the 3GPP technology. Also, a new pseudonym to be allocated to an authenticated user is generated. The pseudonym is encrypted by the keying materials generated by the EAP-SIM, and its integrity is protected. In the meantime, a Message Authentication Code (MAC) is calculated on the EAP message using keys generated by the EAP-SIM, such that the calculated MAC may be used as a network authentication value at step S609.

The 3GPP AAA server 660 loads the RAND, MAC, and protected pseudonym on the 'EAP Preauth Request/SIM-Challenge' message, such that the resultant 'EAP Preauth Request/SIM-Challenge' message is transferred to the IEEE 802.16 authenticator 620 via the IEEE 802.16 AAA server 640. The 'EAP Preauth Request/SIM-Challenge' message is finally transferred to the mobile node (MN) via the IEEE 802.16 authenticator 620. Also, the 3GPP AAA server 660 includes a 'Result Indication' message to the mobile node (MN). The 'Result Indication' message indicates whether or not a 'Success Result' message will be protected at the end of the authentication procedure. The protection or non-protection of the result message depends upon an operator policy. The 3GPP AAA server 660 includes the 'Kc' value in the 'EAP Preauth Request/SIM-Challenge' message and transmits the resultant 'EAP Preauth Request/SIM-Challenge' message to the IEEE 802.16 AAA server 640. Additional keying materials are generated by the IEEE 802.16 AAA server 640, such that unique confidentiality or integrity of the IEEE 802.16 AAA server 640 can be guaranteed by the additional keying materials at step S610.

The mobile node (MN) 600 performs a GSM A3/A8 algorithm contained in the SIM on each of received RANDs several times (i.e., N times), such that N SRESs and Kc values can be generated. The mobile node (MN) may generate additional keying materials from N Kc and NONCE_MT values. The mobile node (MN) calculates a network authentication MAC using the newly-generated keying materials, and determines whether the calculated network authentication MAC is equal to the received MAC.

If the MAC is wrong, the network authentication is failed, and the mobile node (MN) cancels this authentication. If the MAC is correct, the mobile node (MN) continuously performs the authentication procedure. The mobile node (MN) may calculate a new MAC on the EAP message having the N SRESs using new keying materials. Upon receiving the protected pseudonym, the mobile node (MN) stores the received pseudonym for future authentication at step S611.

The mobile node (MN) may transfer the 'EAP Preauth Response/SIM Challenge' message having the calculated RES and MAC values to the IEEE 802.16 authenticator 620. Upon receiving the same indication parameter from the 3GPP AAA server 660, the mobile node (MN) includes the 'Result Indication' parameter in the 'EAP Preauth Response/SIM-Challenge' message. If the same indication parameter is not received from the IEEE 802.16 authenticator 620, the mobile node (MN) does not include the 'Result Indication' Parameter in the 'EAP Preauth Response/SIM-Challenge' message. The IEEE 802.16 authenticator 620 may transfer the 'EAP Preauth Response/SIM-Challenge' message to the 3GPP AAA server 660 via the IEEE 802.16 AAA server 640 at step S612.

The 3GPP AAA server 660 compares its own MAC with the received MAC, such that it can perform user authentication at step S613.

If the comparison result was successful at step S613, the 3GPP AAA server 660 may transmit the 'EAP Preauth Request/SIM-Notification' message before transmitting the 'EAP Preauth Success' message. The 'EAP Preauth Request/SIM-Notification' message can be protected by the MAC at step S614.

Unique security-associated parameters of the 3GPP network may be transferred from the 3GPP AAA server 660 to the 3GPP authenticator 690. The unique security-associated parameters are indicative of authentication vectors, which have been generated for the corresponding MN at step S606. The security-associated parameters may further include IMSI- or TMSI-associated information, and may be transmitted via a Mobile Application Part (MAP) protocol. The security-associated parameters are used when the authentication procedure will be carried out by the 3GPP network in future.

The 'EAP Preauth Request/SIM-Notification' message may further include not only the security information but also keying materials for protecting either unique confidentiality or integrity of the 3GPP network. The 3GPP AAA server 660 transfers the resultant message to the 3GPP network via the AAA protocol message. The 3GPP network stores the keying materials, such that it uses the stored keying materials to communicate with the authenticated mobile node (MN) at step S615.

In response to the 'EAP Preauth Request/SIM-Notification' message, the mobile node (MN) may transfer the 'EAP Preauth Response/SIM-Notification' message to the IEEE 802.16 authenticator 620. The IEEE 802.16 authenticator 620 transfers the 'EAP Preauth Response/SIM-Notification' message to the 3GPP AAA server 660 via the 3GPP authenticator 690 at step S616. However, at step S616, the 3GPP AAA server 660 may disregard contents of the 'EAP Preauth Response/SIM-Notification' message.

The 3GPP AAA server 660 transmits specific information indicating the success or failure of the EAP to the IEEE 802.16 authenticator 620. This specific information may be transferred to the IEEE 802.16 authenticator 620 via the 3GPP authenticator, and the IEEE 802.16 authenticator 620 informs the mobile node (MN) of the success of authentication using the 'EAP Preauth Success' message.

If the EAP SIM procedure has been successfully completed, the mobile node (MN) and the 3GPP network share the authentication vectors and the keying materials after performing the L2 handover, such that the mobile node (MN) can stably communicate with and the 3GPP network at step S617.

The mobile node (MN), which has performed the pre-authentication procedure with the target network authenticator 690 at steps S614~S617, can perform the L2 handover to the target network 690. Therefore, after the above handover, a new authentication procedure and a key setup procedure between the mobile node (MN) and the target network may be omitted as necessary. If the L2 handover (i.e., a second layer (L2) handover), the MAC of the mobile node (MN) 600 establishes a security association (SA) with an access point of the target network authenticator 690, and is ready to communicate with the access point at step S617.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is obvious to those skilled in the art that claims having no explicit citation relationships are combined with each other to implement the embodiments, or new claims obtained by the amendment after the patent application may also be contained in the present invention without departing from the scope and spirit of the present invention.

As apparent from the above description, the embodiments of the present invention can be applied to a variety of wireless access systems, for example, a 3rd Generation Partnership Project (3GPP), a 3GPP2, and/or an IEEE 802.xx (Institute of Electrical and Electronic Engineers 802) system. The embodiments of the present invention can be applied to not only the various wireless access systems but also all the technical fields acquired by the application of these wireless access systems.

What is claimed is:

1. A method for performing pre-authentication by a mobile terminal before a handover to a target network in order to quickly perform an Inter-Radio Access Technology (Inter-RAT) handover, the method comprising:

transmitting an extensible authentication protocol (EAP) pre-authentication start message including mobile terminal information needed for the pre-authentication to a target authentication server via a serving authentication server, wherein the mobile terminal information includes specific information defining the pre-authentication, an identifier of a serving network, an identifier of the serving authentication server, an identifier of the target network, an identifier of the mobile terminal, and a Media Access Control (MAC) address of the mobile terminal;

receiving an EAP pre-authentication request message including first security-associated information of the target network from the target authentication server via the serving authentication server, wherein the first security-associated information is based on the mobile terminal information, and wherein the first security-associated information includes a random number (RAND), an authentication token (AUTN), a message authentication code (MAC), and protected pseudonym information;

transmitting an EAP pre-authentication request message including second security-associated information generated using the first security-associated information to the target authentication server via the serving authentication server, wherein the second security-associated information is used by the mobile terminal in the target network; and performing the handover to the target network after completion of the pre-authentication by the target authentication server based on the second security-associated information.

2. The method according to claim 1, wherein the second security-associated information is generated by an integrity key and a cipher key in the mobile terminal.

3. The method according to claim 1, wherein the first security-associated information is associated with the target authentication server, and the second security-associated information is associated with the mobile terminal.

4. A method for performing pre-authentication by a serving authentication server before a handover to a target network in order to quickly perform an Inter-Radio Access Technology (Inter-RAT) handover, the method comprising:

forwarding an extensible authentication protocol (EAP) pre-authentication start message including mobile terminal information needed for the pre-authentication to a target authentication server, wherein the EAP pre-authentication start message is received from a mobile terminal, and wherein the mobile terminal information includes specific information defining the pre-authentication, an identifier of a serving network, an identifier of the serving authentication server, an identifier of the target network, an identifier of the mobile terminal, and a Media Access Control (MAC) address of the mobile terminal;

forwarding an EAP pre-authentication request message including first security-associated information received from the target authentication server to the mobile terminal, wherein the first security-associated information is based on the mobile terminal information, and wherein the first security-associated information includes a random number (RAND), an authentication token (AUTN), a message authentication code (MAC), and protected pseudonym information; and forwarding an EAP pre-authentication response message including second security-associated information received from the mobile terminal to the target authentication server, wherein the second security-associated information is based on the first security-associated information and is for use by the mobile terminal in the target network, wherein the second security-associated information is further for use by the target authentication server to complete the pre-authentication before performance of the handover to the target network by the mobile terminal.

5. The method according to claim 4, wherein the first security-associated information is associated with the target authentication server; and the second security-associated information is associated with the mobile terminal.

6. A method for performing pre-authentication by a target authentication server before a handover to a target network in order to quickly perform an Inter-Radio Access Technology (Inter-RAT) handover, the method comprising:

receiving an extensible authentication protocol (EAP) pre-authentication start message including terminal information from a mobile terminal via a serving authentication server, wherein the mobile terminal information includes specific information defining the pre-authentication, an identifier of a serving network, an identifier of the serving authentication server, an identifier of the target network, an identifier of the mobile terminal, and a Media Access Control (MAC) address of the mobile terminal;

extracting authentication information used at the target network from a home subscriber server (HSS);

generating first security-associated information using the mobile terminal information and the authentication information;

transmitting an EAP pre-authentication request message including the first security-associated information to the mobile terminal via the serving authentication server, wherein the first security-associated information includes a random number (RAND), an authentication token (AUTN), a message authentication code (MAC), and protected pseudonym information;

receiving an EAP pre-authentication response message including second security-associated information from the mobile terminal via the serving authentication server, wherein the second security-associated information is based on the first security-associated information and is for use by the mobile terminal in a target network; and completing the pre-authentication using the second security-associated information, in order to facilitate subsequent performance of the handover to the target network by the mobile terminal.

7. The method according to claim 6, wherein:

the first security-associated information is associated with the target authentication server; and the second security-associated information is associated with the mobile terminal.

\* \* \* \* \*